(12) United States Patent
Caux et al.

(10) Patent No.: US 9,725,894 B2
(45) Date of Patent: Aug. 8, 2017

(54) FLUID BACKFLOW MANAGEMENT SYSTEM AND METHOD OF USE THEREOF

(71) Applicant: 7525443 Canada Inc., Saint-Mathieu de Beloeil, Quebec (CA)

(72) Inventors: Guylaine Caux, Sainte-Julie (CA); Martin Gauthier, Sutton (CA); Yves Racine, Saint-Jean-Port-Joli (CA); Patrick Savaria, Longueuil (CA)

(73) Assignee: 7525443 CANADA INC., Saint-Mathieu-de-Beloeil (CA)

( * ) Notice: Subject to any disclaimer, the term of this patent is extended or adjusted under 35 U.S.C. 154(b) by 0 days.

(21) Appl. No.: 14/864,174

(22) Filed: Sep. 24, 2015

(65) Prior Publication Data

US 2016/0083953 A1 Mar. 24, 2016

Related U.S. Application Data

(63) Continuation-in-part of application No. 14/038,605, filed on Sep. 26, 2013, now Pat. No. 9,157,227, which is a continuation-in-part of application No. 12/885,680, filed on Sep. 20, 2010, now abandoned, which is a continuation-in-part of application No. 11/955,990, filed on Dec. 13, 2007, now abandoned.

(51) Int. Cl.
*E03F 7/04* (2006.01)
*F16K 7/10* (2006.01)
*E03D 11/00* (2006.01)
*E03F 5/042* (2006.01)

(52) U.S. Cl.
CPC .............. *E03F 7/04* (2013.01); *E03D 11/00* (2013.01); *F16K 7/10* (2013.01); *E03F 5/042* (2013.01); *Y10T 137/2521* (2015.04); *Y10T 137/7306* (2015.04); *Y10T 137/7761* (2015.04); *Y10T 137/7769* (2015.04); *Y10T 137/8342* (2015.04)

(58) Field of Classification Search
CPC ...... F16K 17/10; E03F 7/04; Y10T 137/2521; Y10T 137/7306; Y10T 137/8342; Y10T 137/7761; Y10T 137/7762; Y10T 137/7769
USPC ........ 138/93; 137/392, 558, 487.5, 588, 492
See application file for complete search history.

(56) References Cited

U.S. PATENT DOCUMENTS

| | | | | |
|---|---|---|---|---|
| 4,417,598 A | * | 11/1983 | DePirro | E03F 7/04 137/2 |
| 4,494,345 A | * | 1/1985 | Peterson | E03F 7/04 137/414 |
| 5,348,270 A | * | 9/1994 | Dinh | F16K 7/10 137/553 |
| 5,372,162 A | * | 12/1994 | Frey | F16L 55/1645 138/93 |

(Continued)

*Primary Examiner* — William McCalister
(74) *Attorney, Agent, or Firm* — Brouillette Legal Inc.; Damien Calvet

(57) ABSTRACT

An apparatus for continuously controlling fluid flow in a sewer conduit, comprising: a) moisture sensors detecting levels of fluid in this conduit; b) an inflatable bladder, mounted in the sewer conduit for releasably sealing in fluid tight fashion a section of this conduit; a compressed air source for inflating the bladder; and a control box including a CPU sensitive to the moisture sensor(s) and actuating the air compressor responsively to conduit fluid level conditions reaching beyond a preset threshold value. The performance of the apparatus is independent of the speed of fluid flow in the sewer conduit.

18 Claims, 18 Drawing Sheets

(56) References Cited

U.S. PATENT DOCUMENTS

| | | | | |
|---|---|---|---|---|
| 5,400,814 A * | 3/1995 | Tigerholm | .............. | F16L 41/06 137/15.15 |
| 5,413,136 A * | 5/1995 | Prescott | .................... | F16K 7/10 137/362 |
| 5,462,077 A * | 10/1995 | Cohen | ....................... | F16K 7/10 137/15.08 |
| 5,524,661 A * | 6/1996 | Tigerholm | .............. | F16L 55/12 137/15.15 |
| 5,558,131 A * | 9/1996 | Cohee | .................... | F16L 55/128 137/225 |
| 5,778,919 A * | 7/1998 | Petrone | ................ | F16L 55/124 137/15.08 |
| 5,901,752 A * | 5/1999 | Lundman | .............. | F16L 55/134 138/89 |
| 5,996,621 A * | 12/1999 | Hagiwara | ................. | E03F 3/06 137/315.01 |
| 6,348,869 B1 * | 2/2002 | Ashworth | ............... | F16L 55/44 138/93 |
| 6,516,832 B1 * | 2/2003 | Myers | .................... | E03B 7/003 138/93 |
| 2005/0224118 A1 * | 10/2005 | Tornay | ..................... | F17D 5/06 137/624.11 |
| 2009/0152480 A1 * | 6/2009 | Savaria | .................... | E03F 7/00 251/12 |

* cited by examiner

FLUID BACKFLOW MANAGEMENT SYSTEM AND METHOD OF USE THEREOF

CROSS-REFERENCE TO RELATED APPLICATIONS

This patent application is a continuation in part of U.S. patent application Ser. No. 14/038,605 filed on Sep. 26, 2013 which is a continuation in part of U.S. patent application Ser. No. 12/885,680 filed on Sep. 20, 2010. The application Ser. No. 12/885,680 was also a continuation in part of U.S. patent application Ser. No. 11/955,990, filed on Dec. 13, 2007 now abandoned. All incorporated herein by reference.

FIELD OF THE INVENTION

The present disclosure relates to the field of fluid flow control systems concerned with fluid backflow or fluid leaks, for sewer ducts, gas pipelines, and the like.

BACKGROUND OF THE INVENTION

There exists a plurality of situations wherein it is desirable to control accidental fluid backflow flow in specific circumstances, or to monitor the fluid flow in pipes.

In a building or other structures serviced via an underground sewer line, it sometimes occurs that the main sewer line or the branch line leading from the building to the main sewer line becomes clogged. Indeed, the problem of basement flooding from sewer line water backflow flow has become prevalent in recent years. The backflow may be caused by a variety of problems including when the flow capacity of the sewer system is exceeded by the rain water inflow rate into the system.

The risk of water backflow is present in most storm sewer systems where the storm sewers are rarely of a sufficient size to accommodate unusually heavy rain storms. This risk is sometimes present in sanitary sewer system where there is a water leakage into the sewer system through manholes, cracks in sewer line joints or where improper roof down spout connections are made to the system which normally should carry only the water and sewage draining from sinks, toilets, washing machines drain lines and basement floor drains.

Clogging of the sewer line may be caused by many factors including broken or misaligned pipes. Such broken or misaligned pipes present projections, ridges or sharp bends on which bulk material hangs up and causes a nucleus fore clogging. Other times, roots from surface plants invade the pipe in search of moisture which may be leaking from poorly formed joints in the pipe and these roots also can form the nucleus of the clog in the pipe. Whatever the cause of the clog, the effect is that the sewage becomes backed up in the line and eventually the backflow will overflow from the fixtures and drains in the building.

Modern sewer systems are equipped with clean out pipes or outlets. The clean out is accomplished by inserting a Tee or Y joint in the sewer line just outside the building or in the basement. Leading from the Tee or Y joint is a vertical or near vertical clean out pipe which is kept or plugged near the ground surface. While this type of clean out allows for access to the sewer line for removal of clog, it does not prevent the backflow or sewage through the sewer line which will eventually overflow from the fixtures or drain inside of the building.

Backflow problems in sanitary sewer lines leading to an individual home can be substantially eliminated by the application of a backflow preventing valve in the pipe line extending between the home and the underground sanitary sewer line running along the street involved. When backflow water pressure builds up, the backflow preventing valve is closed or closes to prevent the water in sanitary sewer lines from backing up into the user's home.

However, many home owners simply do not wish to install such systems. Indeed, conventional flow protection usually consists of a simple check valve, more particularly a flap valve mounted inside the sewer duct, which functions as a pivotable gate providing for unidirectional flow of the fluid in the sewer line away from the source. However, these pivotal gates are only efficient when the fluid flow inside the sewer is at fast speed, since the gate will then be forcibly pivotally biased against its annular seat inside the sewer duct by the hydrodynamic forces. Such pivotal gate valve systems are however ineffective in conditions of sewer duct clogging, since the fluid level inside the sewer duct raises quite progressively, and the fluid flow speed is usually small, which would not provide a hydrodynamic force suitable for pivotally biasing the pivotal gate against its annular seat in a fluid tight fashion.

Inflatable bladders may be used in place of pivotal gate valves, although these bladders create a phenomenon of fluid flow turbulence. When these bladders are in their inoperative deflated condition, they remain in a radially inwardly projecting condition inside the sewer duct passage that constitutes a partially obstructive element. Moreover, such inflatable bladders may require manual handling to be deflated.

Furthermore, most conventional fluid backflow mitigating prior art systems are not efficient in early detection of fluid and thus are relatively unreliable and inefficient.

SUMMARY OF THE INVENTION

Accordingly, there exists a need for an improved fluid backflow management system that can be used in a variety of situations such as in sewer lines to prevent sewer backflow into basements, in municipal conduits to manage fluid flows or interrupt flow in case of pipeline leaks as a means to contain the problem and limit spreading of hazardous materials.

It is an aim of the present disclosure to provide an assembly of a conduit in which a fluid flows and of a system for blocking the conduit upon detecting a problem condition for the fluid, comprising: a conduit defining an inner cavity in which the fluid flows; an inflatable bladder adapted to be mounted in a section of the inner cavity of the conduit, the inflatable bladder inflatable/deflatable between a deflated inoperative condition and an operative inflated condition in which the bladder is inflated for sealingly closing the conduit section; at least one sensor assembly comprising a pair of wires connected to a sensor adapted to detect the problem condition of the fluid and positioned in the conduit on at least one side of the inflatable bladder, and beyond a contact area between the inflatable bladder and the conduit, the side being that related to the problem condition of the fluid; a pressure system in fluid communication with the inflatable bladder to inflate the bladder to the operative inflated condition, and to deflate the bladder; and a processor unit for actuating the pressure system when the problem condition is detected by the at least one sensor, and for subsequently deflating the bladder when the problem condition is no longer detected wherein said sensor assembly is at least partially covering and overlapping the inflatable bladder. According to another aspect of the present invention, the sensor assembly may be at least partially integrated to the bladder.

It is a further aim of the present disclosure to provide a novel system for blocking fluid pipes upon detection of a given condition of fluid flow in the fluid pipe.

The invention is directed to an assembly for blocking a conduit upon detecting a problem condition for a fluid, the conduit defining an inner cavity in which the fluid flows and having a longitudinal axis, the conduit being in fluid communication with a clean-out duct transversally opening into the inner cavity of the conduit and having a longitudinal axis forming an angle of about 45 degrees with the axis of the conduit; the assembly comprising:

an inflatable bladder configured to be inserted in a section of the inner cavity of the conduit via the clean-out duct, the inflatable bladder once inflated having a toroidal shape having a longitudinal axis aligned with the longitudinal axis of the conduit, the bladder being inflatable/deflatable between a deflated inoperative condition and an operative inflated condition in which the bladder is inflated for sealingly closing the conduit section;

at least one sensor adapted to detect the problem condition of the fluid and positioned in the conduit on at least one side of the inflatable bladder, and beyond a contact area between the inflatable bladder and the conduit, the side being that related to the problem condition of the fluid; and a control panel having:
a pressure system in fluid communication with the inflatable bladder to inflate the bladder to the operative inflated condition, and to deflate the bladder; and
a processor unit for actuating the pressure system when the problem condition is detected by the at least one sensor, and for subsequently deflating the bladder when the problem condition is not detected.

The invention is also directed to a method for blocking a conduit upon detecting a problem condition for a fluid flowing in the conduit, the conduit defining an inner cavity in which a fluid flows and having a longitudinal axis, the conduit being in fluid communication with a clean-out duct transversally opening into the inner cavity of the conduit and having a longitudinal axis forming an angle of about 45 degrees with the axis of the conduit. The method comprises the steps of:

inserting an inflatable bladder in a section of the inner cavity of the conduit via the clean-out duct, the inflatable bladder once inflated having a toroidal shape having a longitudinal axis aligned with the longitudinal axis of the conduit, the bladder being inflatable/deflatable between a deflated inoperative condition and an operative inflated condition in which the bladder is inflated for sealingly closing the conduit section;

detecting the problem condition of the fluid using at least one sensor positioned in the conduit on at least one side of the inflatable bladder, and beyond a contact area between the inflatable bladder and the conduit, the side being that related to the problem condition of the fluid;

inflating the bladder to the operative inflated condition using a control panel having a pressure system in fluid communication with the inflatable bladder to inflate the bladder, and a processor unit for actuating the pressure system when the problem condition is detected by the at least one sensor; and subsequently deflating the bladder when the problem condition is not detected.

In accordance with the teachings of the disclosure, there is disclosed an apparatus for continuously controlling fluid flow in a conduit, comprising: a) sensor means, for detecting the level of fluid in this conduit; b) conduit sealing means, for releasably sealing in fluid tight fashion a section of this conduit; c) main power means, for actuating said sealing means; and d) control means, sensitive to said sensors means and actuating said main power means responsively to a conduit fluid level reaching beyond a threshold value; wherein the performance of said control means is independent of the speed of the fluid flow in the conduit. In addition, the present system may comprise a splash guard which comprises a deflector, preferably impermeable, protecting the sensors means from unwanted splashes of fluid onto the sensors which would otherwise trigger a signal to inflate the bladder in a situation which would not justify same. The deflector is disposed partially underneath the sensor assembly to prevent the unwanted activation of the sensors in the event of a splash of fluid onto the sensor assembly not caused by said problem condition. The deflector is configured to stop such splashes while allowing the sensors to operate if the level of liquid in the conduit reaches the sensors. Such a splash of fluid may happen when a high volume of fluid is flowing in the conduit during normal use. However, the high quantity of fluid should not trigger the sensors as the conduit is functioning normally and no backflow fluid is present in the conduit. This feature of the system allows proper functioning of the fluid backflow prevention system. The splash guard prevents the triggering of false signals due to bursts burst of fluids in the conduit.

Preferably, said control means are further sensitive to the deactivation of said main power means, and further including power backflow means, whereupon said control means automatically activating said conduit sealing means independently of fluid level in the conduit when said main power means becomes deactivated. Said control means preferably further includes a self-test function for the power backflow means that checks at predefined regular time intervals if said conduit sealing means is operative, and further including alarm means (sound, light or otherwise) issuing an alarm detectable by the apparatus user upon said control means detecting that said power backflow means has become inoperative. In addition to the sound alarm, an alarming system could be configured to otherwise alert the home owner or operator of a conduit network when a problem has been detected about a certain conduit condition.

According to one embodiment, the alarm system may trigger various communications at various levels. For instance, an alarm alert message or notification could be sent to a main controller for initiating an immediate response from the fluid management system. A message could also be sent to the owner/user for informing about a detected problem. A message could also be sent to a water control panel for associating the deployment of the fluid backflow preventing device to an interruption of the building water supply. Such association between the fluid backflow preventing devices with the interruption of the water supply is used to prevent further flooding of the installations/building/house. For example, the conduit system (i.e. a sewer conduit system) may be unable to operate due to the activation of the fluid backflow preventing device, as such, the main water supply should be interrupted to prevent further damages that may occur as a result of the conduit system being interrupted.

It is a further aim of the present disclosure to provide, a fluid management system able to control the water supply interruption module automatically, while the premises are unoccupied or manually triggered while the premises are occupied. As such, in the absence of people in the premises, the need for water could be completely interrupted thus preventing further use of the conduit network and resulting flooding due to blocking of the conduits. In another situation where the premises are occupied, people living in the home are in need of water, the interruption could be manually controlled via a main water supply control using a wireless device such as a smart phone. People inhabiting the house could still use the water for drinking but would, in this scenario, be prevented from using the dishwasher, washer, taking a shower, and other high draining requirement uses.

Preferably also, said conduit sealing means includes an inflatable bladder for mounting into the conduit section, and further including inflating means for inflating the bladder between a deflated inoperative condition and an operative inflated condition for sealingly closing the conduit section. Said inflatable bladder could then have in its operative inflated condition a portion of toroidal shape for sealingly engaging the conduit section. Said bladder could be elongated with two opposite end portions each forming a convex half sphere. Said sensors means could include at least one pair (preferably two pairs) of positive and negative electrical cables, said cables extending between said control means and said bladder, and moisture sensors mounted at the end of said cables located about said bladder. Said moisture sensors are preferably covered by non corrodible fluid proof conducting alloys, and uses electrical conductivity measures for determining the fluid level in the conduit.

It is a further aim of the present disclosure to provide a fluid backflow prevention device configured with unique identifiers and the ability to transfer data over a network without requiring human-to-human or human-to-computer interaction. As such, the device can automatically transfer information acquired from its sensors to various devices and systems such as a fluid management control system, a remote alert monitor, a central server storing conduit network information, remote connection or alert devices or any other system or device able to interact with the fluid backflow prevention device and related systems. In addition, fluid backflow prevention system may communicate with one another in a multi device system or network. The fluid backflow prevention device and fluid management system may be integrated through wired or wireless communication with local control panel in wired connection with the devices. Alternative embodiment may comprise wireless capable devices that directly communicate to a central management system having a local control panel. The connectivity of the devices will vary depending on the complexity and sophistication of the system installed. As such, a municipality could have a conduit network having a fluid management system with a plurality of fluid backflow prevention devices whereas a single family home would most likely only require one or two fluid backflow prevention devices which may easily be wired to a home control panel in the home. In the latest case, the home control panel could be in wireless connection with the corresponding control panels of the nearby homes and/or connected to a central monitoring station having data from all connected fluid backflow prevention device.

It is a further aim of the present disclosure to provide a fluid management system interacting with fluid backflow prevention devices. Various types of connections and interactions may be suitable for the fluid backflow prevention device to interact with the user and/or a central or local fluid management system. As such, the fluid backflow prevention device may have bidirectional communication capabilities, connectivity between the system and control station or remote control device, or between the control station and remote control devices.

It is a further aim of the present disclosure to provide a fluid management system having integrated conduit network topography for anticipating conduit backflow within the conduit network. For instances, upon detection of a fluid backflow on a premise down a hill, the system may initiate a back prevention alert wherein adjacent system for premises located uphill get alerted of the upcoming or potential fluid backflow event and trigger the system beforehand.

In accordance with the teachings of the disclosure, the fluid management system may be integrated with fluid back up devices and automated to detect a problem in a conduit and actuate fluid back up devices according to the detected situation. In addition, the fluid back up device may be interlinked with additional devices to prevent or at least mitigate the consequences of the deployment of the fluid backflow device and consequently and potentially interrupt fluid flow within a conduit. The fluid management system may interlink fluid backflow devices with a water closure/interruption devices. Alternatively, the fluid management system may alert a user to trigger manual closure/interruption of the main water inlet in the building. Likewise, the fluid management system may automatically trigger closure or interruption of the water heating equipment following the closure/interruption of the main water inlet, thus preventing damages to water heating equipment. Accordingly, alert may be sent using SMS, internet messages, WIFI communications, or any other suitable wired or wireless communication protocol or technology.

It is a further aim of the present disclosure to provide a fluid management system comprising fluid backflow device having wireless sensors. Piezoelectric sensors mounted to the bladder or adjacent thereto in the conduit are an alternate embodiment reducing the need for electrical wires. Therefore, the fluid backflow prevention device could wirelessly communicate with the fluid management system to alert the detection of a fluid backflow in the conduit. Such a wireless fluid backflow prevention device may be installed with a gas (i.e. $CO_2$) cylinder and allow installation without the need for electrical infrastructures. A wireless fluid backflow system may be favored in conduit where access to utilities is difficult or where space is limited.

The disclosure also relates to a method for operating an apparatus for continuously controlling fluid flow in a conduit, the apparatus of the type comprising sensor means for detecting levels of fluid in this conduit, conduit sealing means for releasably sealing in fluid tight fashion a section of this conduit, main power means for actuating said sealing means, and control means, sensitive to said sensors means and actuating said main power means responsively to a conduit fluid level reaching beyond a threshold value so that the performance of said control means is independent of the speed of the fluid flow in the conduit; wherein the method comprises the following steps:

a) said sensor means sensing a fluid level beyond said threshold value;
b) said control means analyzing data coming from the sensors means; and
c) said control means actuating said conduit sealing means responsively to said data.

Preferably, there is further included the following steps:
d) having said sensor means detecting fluid level returning to condition short of said threshold level;
e) said control means analyzing this latter data from said sensors means; and f) said control means deactuating said main power means responsively to the latter data.

The disclosure also relates to the combination of sewer conduit for fitting to a dwelling, said conduit having a clean-out duct mounted transversely thereto and opening into said fluid flow channel, and the above-noted apparatus.

The disclosure also relates to a method for installing and releasably locking a valve apparatus inside a clean-out duct of a sewer conduit, the valve apparatus for continuously controlling fluid flow in the conduit, the apparatus including: a) sensor means, for detecting the level of fluid in this conduit; b) conduit sealing means, for releasably sealing in fluid tight fashion a section of this conduit; c) main power means, for actuating said sealing means; and d) control means, sensitive to said sensors means and actuating said main power means responsively to a conduit fluid level reaching beyond a threshold value; wherein the performance of said control means is independent of the speed of the fluid flow in the conduit, the apparatus further including a discoid support member releasably mounted inside the clean-out duct, a hang screw rod assisting in the positioning of said discoid support system in said clean-out duct, said sealing means being an inflatable bladder, said inflatable bladder in deflated configuration movable to a set position inside the clean-out duct, and further including retaining clips to prevent accidental release of said apparatus from its said set position, wherein said method comprises the following steps: a) said hang screw rod moving the said apparatus inside said clean-out duct; and b) said inflatable bladder in deflated configuration emitting a sound cue emitted through said rod, indicating said deflated bladder has reached its said set position inside the clean-out duct. The sound cue may be the sound occurring by the deflated bladder pops out of the clean-out duct, which sound may be transmitted partially by the rod.

Preferably, said sensor means could then include power cables and, upon release of said valve apparatus being required, further including the following step: c) pulling out said apparatus from said fixed position in said clean-out duct, by upwardly pulling said power cables.

Preferably, the sensor could be of various types such as ultrasound, pressure sensors, vibration sensors, gas sensors, wired sensors and piezo-wireless sensors.

Preferably, said clean-out duct defines an annular recess fully clearing said channel, said conduit sealing means including an inflatable bladder mounted into said annular recess, and inflating means for inflating the bladder, said bladder when in an inoperative condition remaining fully inside said annular recess and fully clearing said channel to prevent fluid flow turbulence in the conduit when deflated, and when in an operative inflated condition further extending radially into said channel and fully sealingly closing said channel.

The present disclosure therefore provides a system for blocking fluid flow within a conduit and utilizing an inflatable component which is located permanently in the conduit or a section that allows access to the conduit wanted to protect from fluid flow backflow. An electrical moisture sensor capable of rapidly and accurately detecting the fluctuation of fluid in a conduct and transmitting the information to the circuitry forms part of the disclosure.

A circuitry receives the information from the moisture sensors and then decides whether or not it will activate the inflatable component to prevent fluid backflow.

A backup battery of the circuitry is also provided, in case of electrical mains supply blackout, so as to enable relying on backup battery that will automatically activate the inflatable component by default, independently of fluid level inside the sewer conduit.

DETAILED DESCRIPTION OF THE PREFERRED EMBODIMENT

Figure 1:
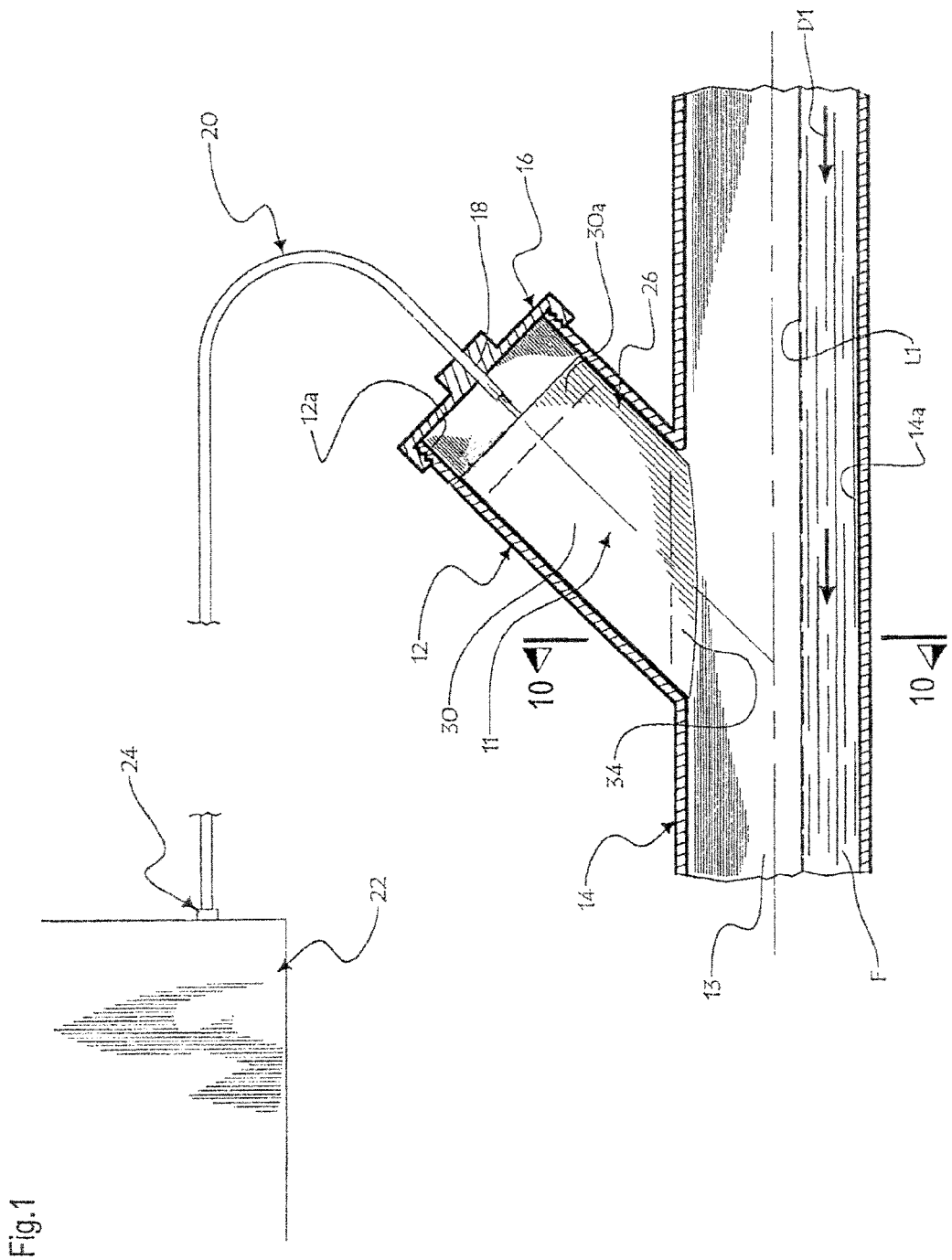
FIG. 1: is a longitudinal sectional view of an intermediate section of sewer conduit, showing a fluid backflow preventing system in accordance with an embodiment of the present disclosure mounted on a transverse clean-out duct into the sewer conduit, the inflatable bladder being shown in a retracted deflated inoperative position inside the clean-out duct.
Figure 2:
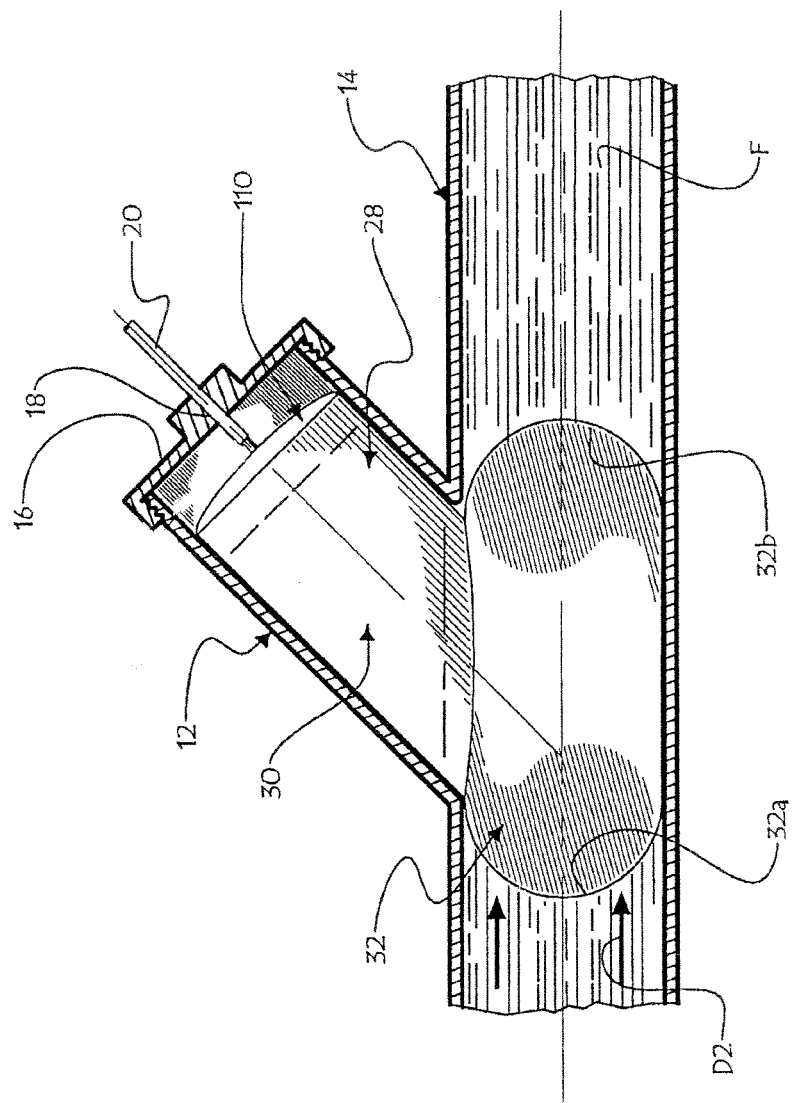
FIG. 2: is a view similar to FIG. 1, but with the inflatable bladder being inflated in a fully inflated operative configuration, extending radially into the sewer conduit and fully closing a section of the latter.

Referring to FIGS. 1 and 2, there is shown a fluid backflow preventing system 11 in accordance with an embodiment of the present disclosure mounted into a clean-out duct 12 transversely opening into the channel 13 of sewer conduit 14. A fluid F, for example a liquid, may flow inside channel 13 at a low fluid level L1, along a normal flow direction D1. Although the present disclosure refers to the positioning of parts of the system 11 in the clean-out duct 12, it is pointed out that any other arrangement may be used for the positioning of fluid blocking components in the channel 13 of any type of conduit 14 (e.g., gas pipeline).

The clean-out duct 12 is preferably provided with a distal threaded segment 12 a so as to threadingly receive a mounting cap 16 provided with a cap aperture 18 extending centrally there through. The cap aperture 18 is configured and sized so as to fittingly receive at an intermediate section a cable sleeve 20 for protectively enclosing various operative cables (pneumatic line 36 and electrical wires 43, 43', 43", 43''') hereinafter disclosed and also for supporting the valve components in a suitable overlying relationship relative to the sewer conduit 14. Wireless technology may be used as well instead of having electrical cables. In such a case, the remote unit is separately powered.

As mentioned previously, it should be understood that although the fluid backflow preventing system is shown in FIGS. 1 through 11 and hereinafter disclosed as being used in the context of sewer conduits, it could also be used in various other contexts without departing from the scope of the present disclosure. Among other uses, it is considered to use the system 11 to block gas pipelines in case of leaks. For instance, the system 11 may detect the level of a gas in a pipeline, and block the pipeline if the gas level is outside given thresholds. According to another embodiment, the system 11 detects the presence of unwanted fluids in the channel 13, and may block the channel 13. The system 13 may therefore be used to prevent the spill of hazardous matters in the environment.

The sleeve 20 is connected at a proximal end portion thereof to a casing 22 by a suitable connecting ring 24 and at a distal end thereof to a valve means 26. The valve means 26 preferably takes the form of an inflatable component, typically an inflatable bladder 30 at least partially mounted within a bladder sleeve 28, for instance as shown in FIG. 2. Bladder 30 is mounted inside clean-out duct 12. The bladder 30 is adapted to be inflated to an inflated configuration illustrated in FIGS. 2 and 11 wherein its inflated flow-obstructing section 32 projects radially inwardly of channel 13 and abuttingly fully contacts the interior wall 14A (FIG. 1) of the duct 14 in a generally fluid tight fashion so as to prevent or reduce accidental backflow into the latter when given conditions such as fluid overflow are met. That is to say, fluid flow direction D2 (FIG. 2) is prevented, being a reversal of the direction of original normal fluid flow direction D1 (FIG. 1), which is associated with a fluid overflow condition of fluid F inside sewer duct 14 (FIG. 2).

The bladder 30 further includes a distal contacting portion 34 located opposite its flow obstructing portion 32, which is adapted to inflate to a contacting configuration also shown in FIG. 2 when the pre-set fluid overflow condition is met.

Figure 3:
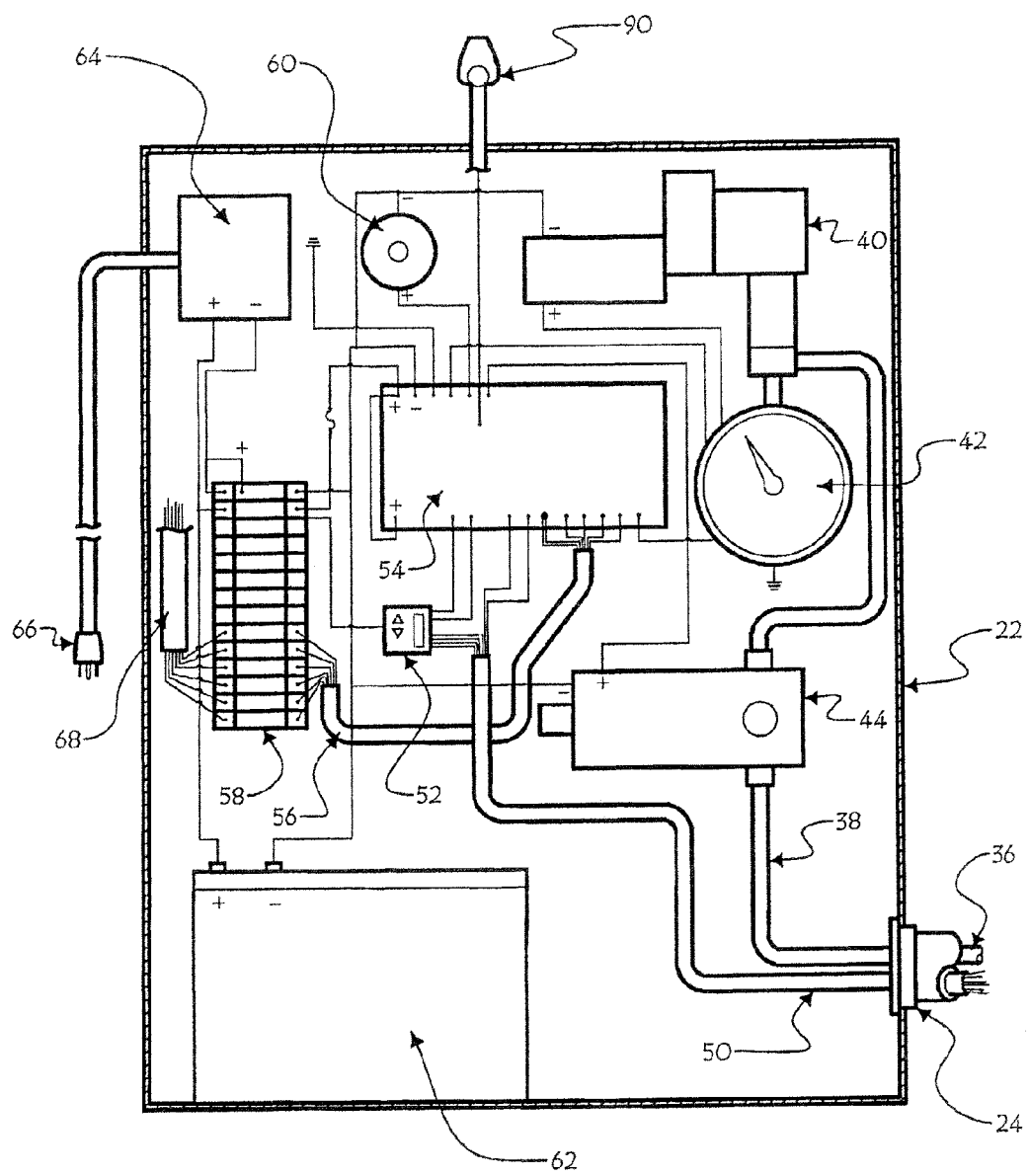
FIG. 3: is a partly schematic enlarged plan view of the control box of a fluid backflow preventing system in accordance with an embodiment of the present disclosure.
Figure 4:
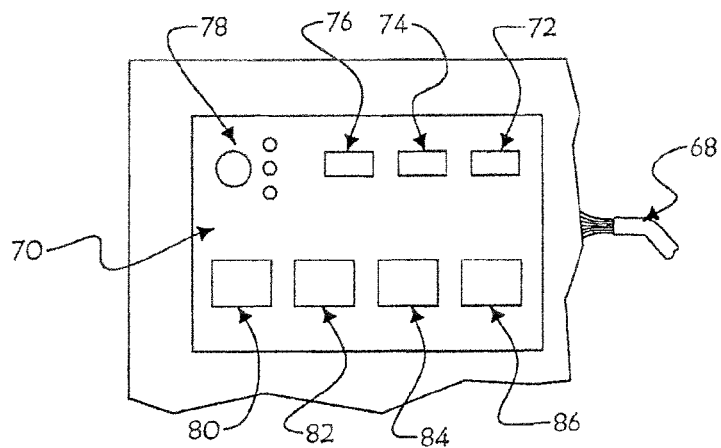
FIG. 4: is a partial plan view of a control panel part of the fluid backflow preventing system of FIG. 3.
Figure 5:
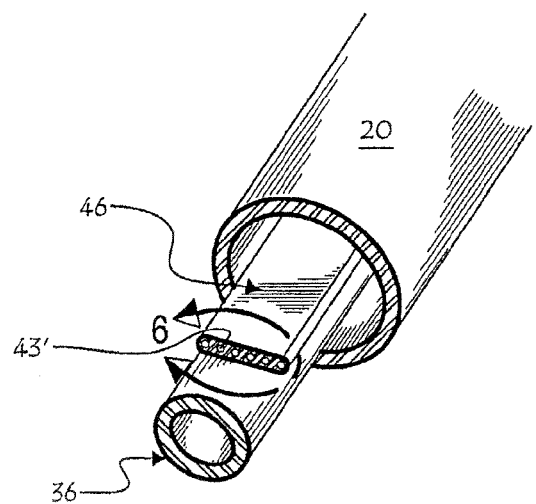
FIG. 5: is a partial enlarged perspective view of a pneumatic tube and electrical wire assembly from the fluid backflow preventing system of FIG. 3.
Figure 6:
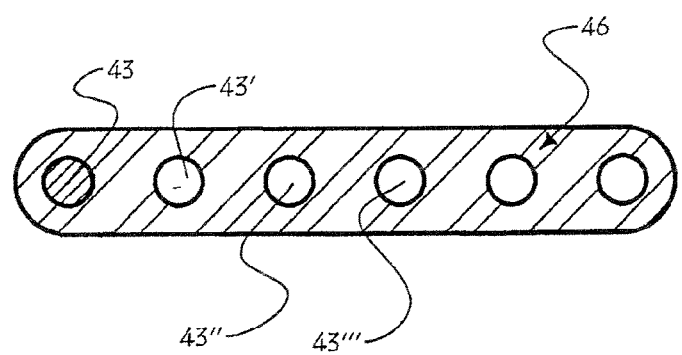
FIG. 6: is an enlarged view of the area circumscribed by an ellipse in FIG. 5.
Figure 7:
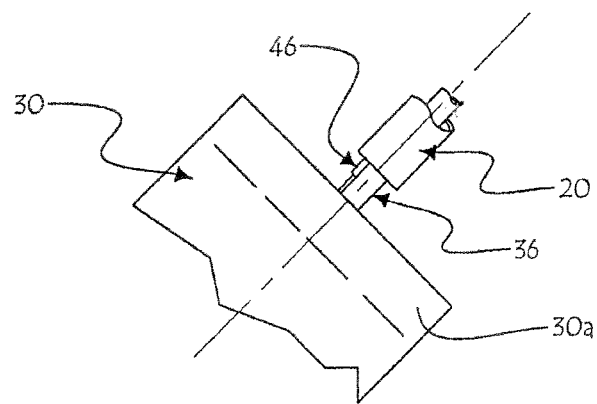
FIGS. 7 and 8: are partial elevation views of the inflatable bladder, suggesting the adjustable nature of cable sleeve connection between electrical circuits and the inflatable bladder of the fluid backflow preventing system of FIG. 3.
Figure 8:
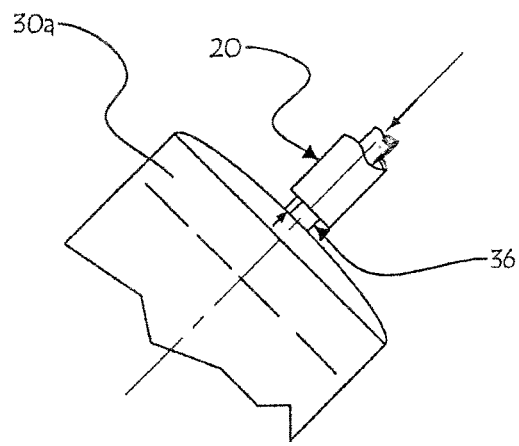
Figure 9:
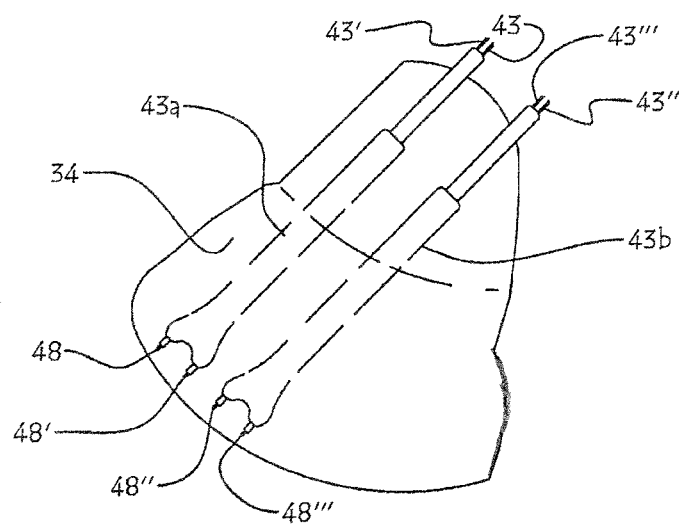
FIG. 9: is a partial perspective view of the inflatable bladder, showing in phantom lines the fluid sensor part inside the bladder of a fluid backflow preventing system of FIG. 3.

As shown in FIGS. 3 and 5, the bladder 30 is pneumatically coupled to pneumatic circuitry located within the casing 22, by an outer pneumatic line 36 protectively enclosed within the sleeve 20. The outer pneumatic line 36 extends integrally into an inner pneumatic line 38 protectively enclosed within the casing 22. The inner pneumatic line 38 is pneumatically coupled to a pneumatic compressor 40 (or to any other source of pressurized air) through a conventional pressure regulator 42 having a built-in automatic shut off function and a conventional pneumatic distributor 44 typically having three-way and two-position functions so as to allow the selective inflation and deflation of the bladder 30. Although not shown, the bladder 30 may use the monitored liquid to become inflated. For instance, if the liquid being monitored is water, the bladder 30 may collect water (e.g., using a pump and line) in the conduit 14 and fill the bladder 30 therewith.

Referring to FIGS. 5 to 9, the sleeve 20 also protectively encloses a contact sleeve 46 enclosing at least one sensor assembly comprising at least one pair of wires 43 and 43', where one is negative and the other positive, and preferably two pairs of wires 43, 43', and 43", 43''' for redundancy purposes (with additional wires as back-up if necessary), to be used with a corresponding number of moisture sensors 48. When the moisture level is high enough, the two pairs of electric wires 43, 43' . . . will start conducting electric current. By moisture level, it is meant a gazeous moisture level, or a liquid moisture level, depending on the type of fluid circulating in channel 13. The wires 43, 43', 43" and 43''' could use a different type of sensor depending on the type of fluid that needs to be detected, for example a methane sensor or other gas sensors could be combined with the existing moisture sensor 43 and 43'. Moreover, the sensors could be used to monitor different characteristics of the flow, such as speed and pressure. It is considered to use ultrasound sensors for such monitoring. The sensor assembly is preferably at least partially covering and overlapping the inflatable bladder 30. According to another embodiment, the sensor assembly could be at least partially integrated to the inflatable bladder.

Figure 18:
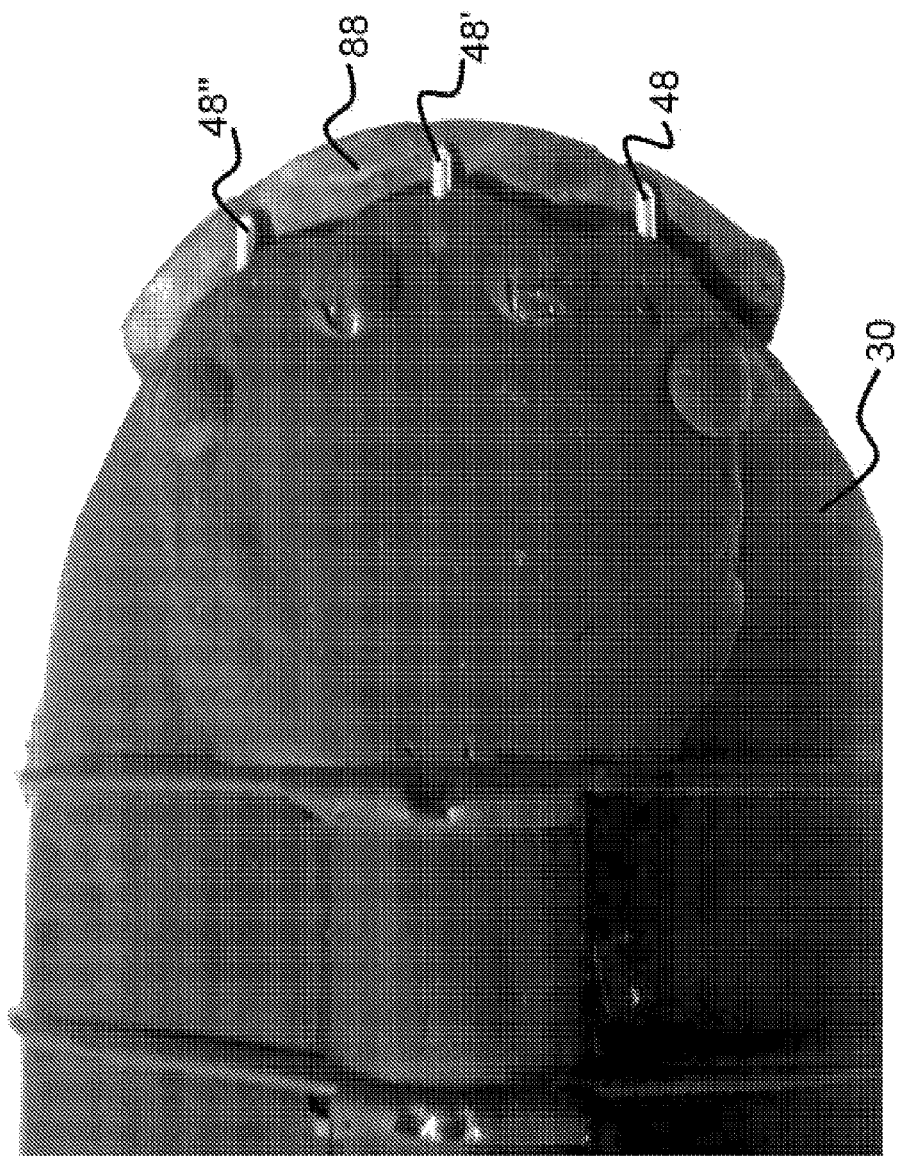
FIG. 18: is a partial enlarged top view of an embodiment of the fluid backflow prevention system wherein the system comprises a deflector preventing unwanted trigger of the system in the event of a splash of fluid.
Figure 19:
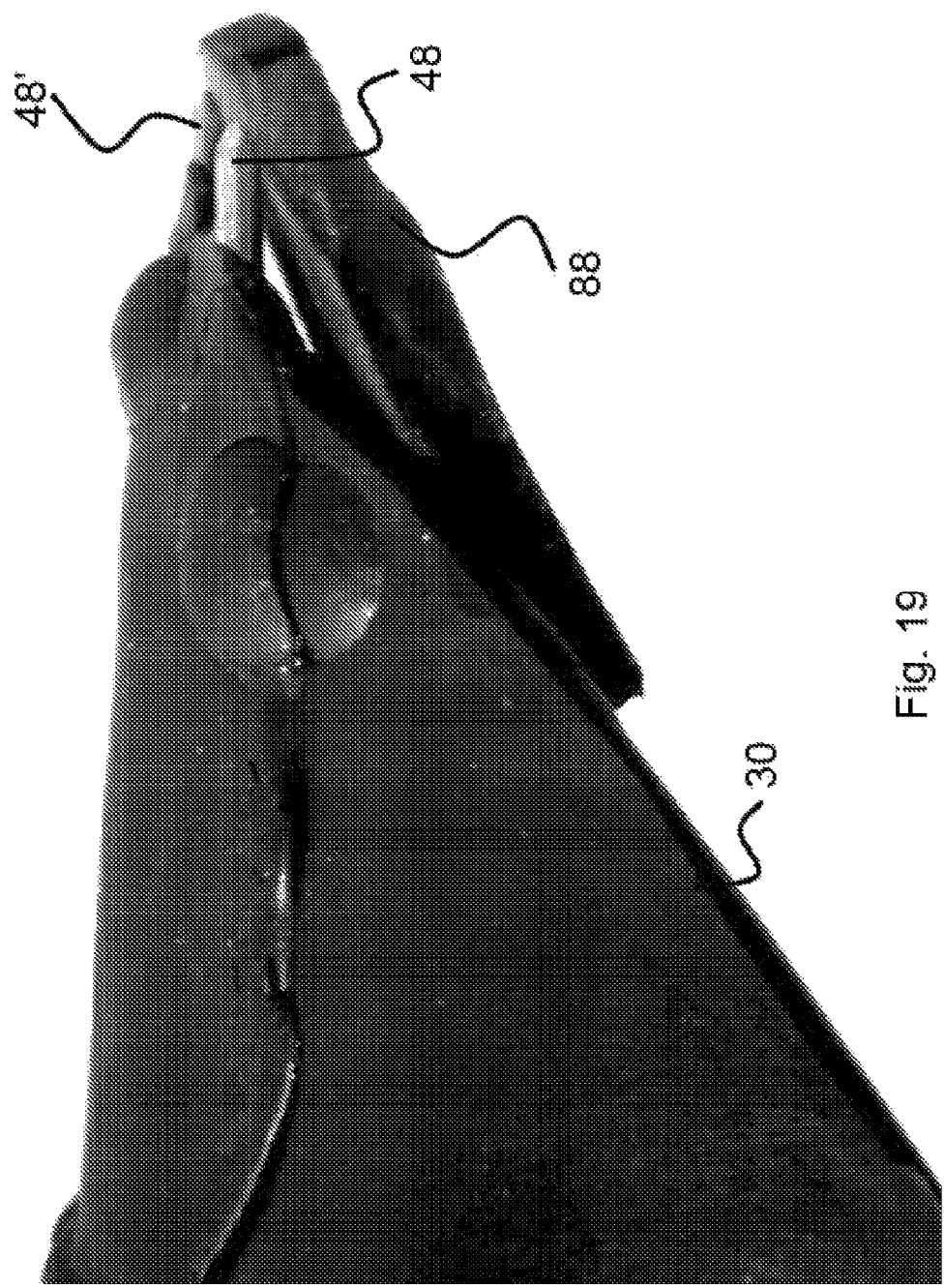
FIG. 19: is a partial enlarged lateral view of the embodiment of FIG. 18.

According to an embodiment, the present system may comprise a splash guard 88 (shown in FIGS. 18 and 19) which comprises a deflector 88, preferably impermeable, protecting the sensors assembly from any splash of fluid which is not the result of. Such a quick splash of fluid may happen when a high volume of fluid is flowing in the conduit. However, the high quantity of fluid should not trigger the sensors 48 if the conduit is functioning normally and no backflow fluid is present in the conduit. This feature of the system allows the proper functioning of the fluid backflow prevention system. The splash guard 88 prevents the triggering of false signals due to bursts of fluid in the conduit. The at least partially protecting of the sensor assembly is achieved in a way that prevents sudden bursts of fluid to trigger the inflation of the bladder. As such, the sensor assembly may be at least partially protected while allowing fluid contact between the sensor assembly and the fluid inside the conduit when a fluid back flow occurs in the conduit. The cover should be installed in a way that prevents the triggering of a signal when a splash occurs but would still allow the triggering of the inflatable bladder when the sensors 48 are, for instance, immersed by the fluid back flow in the conduit.

According to an embodiment, the system could prevent the occurrence of false positive often triggered by splashes of fluid in the conduit. To prevent the false positives, the devices of fluid backflow preventing system 11 may be optimized by increasing the required detection time of the event. Such optimization may substitute the use of a splash guard 88 or be used in combination thereof.

According to an embodiment, these electrical sensors are of the type working at a low level of voltage, for example at the 0.3 volt and 0.1 Ampere range. According to one embodiment, the moisture sensors are mounted about an intermediate section 34 of the inflatable bladder 30, forming the electrical ends of wires 43, 43', 43", 43'". Sensors 48 should preferably be covered by a non-corrodible fluid proof conducting alloy. The sensor assembly comprising the moisture sensors 48 are preferably welded to the bladder 30 by a conventional sonic welding method or any other suitable method, so that these wire portions 43A, 43B become integral to and concealed by the wall of inflatable bladder 30 about bladder portion 30A. Only the end moisture sensor tips 48, 48', 48", 48'", project freely through the intermediate wall of bladder 30, at a peripheral intermediate location of bladder 30 opposite outer end 34 of bladder 30.

The sensor(s) 48, whether it is a moisture level sensor, a liquid detector, a gas detector, or any other fluid detection unit, is strategically positioned on the side of the channel 13 from which the problematic fluid arrives. In the embodiment of FIGS. 1 and 2, the problematic fluid is the backflow of water, for instance from the sewer system. Accordingly, the sensor(s) 48 is at least positioned on the side of the sewer system.

Figure 17:
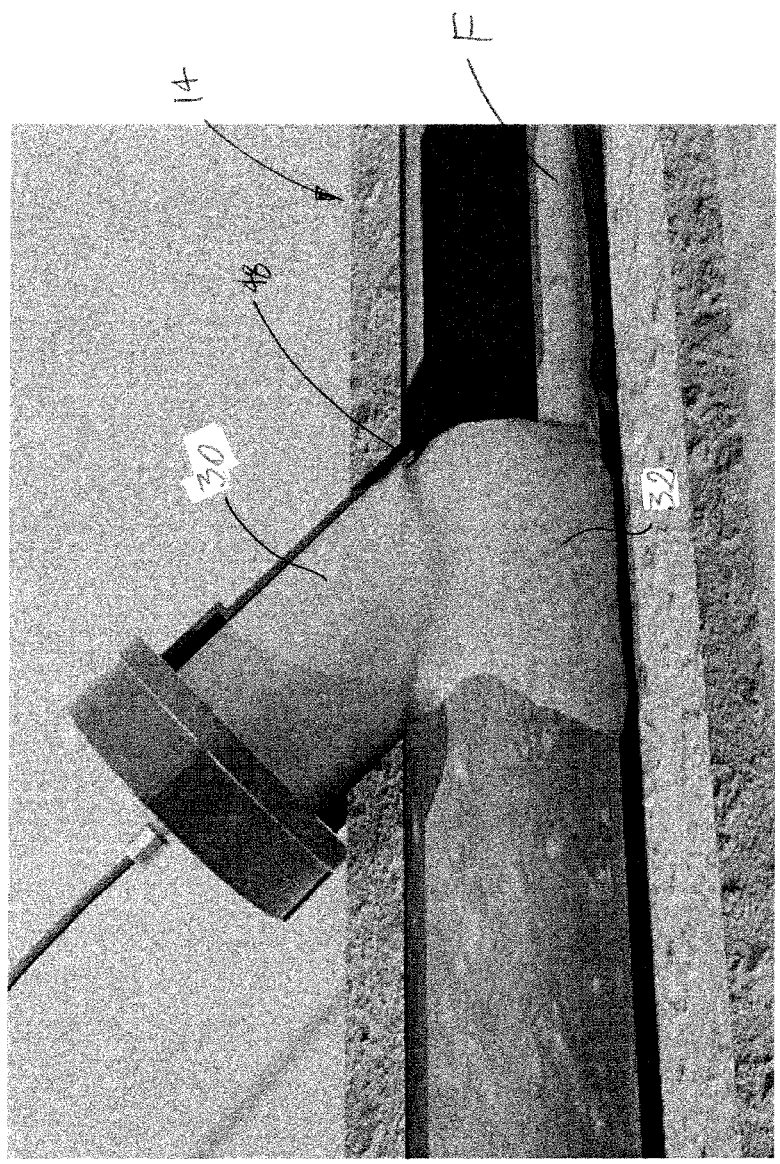
FIG. 17: is a view similar to FIG. 1, but with the inflatable bladder being inflated in a fully inflated operative configuration, showing sensors remaining exposed while bladder is inflated.

By being positioned on the side of the problematic fluid, the sensor(s) 48 quickly detect the problematic fluid (i.e., level outside of threshold, etc.), but will keep on detecting the problematic fluid while the bladder 30 is inflated. In an embodiment illustrated by FIG. 17, the bladder 30 is sized so as not to impede the detecting operation of the sensor(s) 48. When the problematic fluid returns to a level within the threshold, as managed by the central processing unit described hereinafter, the bladder 30 may automatically be deflated once the sensor(s) 48 no longer detects the presence of the fluid. The automatic deflation advantageously facilitates the use of the system 11, as the clean-out duct 12 does not need to be opened to determine whether there remain issues with the problematic fluid.

As shown above, the sensor(s) 48 may be positioned on the inflatable bladder 30, or may be placed in the channel 13 separate from the bladder 30, such that the fluid detection is not altered by the presence of the bladder 30. The sensor assembly is preferably at least partially covering and overlapping the inflatable bladder 30. According to another embodiment, there may be sensors 48 on both sides of the bladder 30. For instance, one of the sensors 48 may detect a sewer fluid presence on one side of the bladder 30, while another one of the sensors 48 on the other side of the bladder 30 may detect hazardous matters or substances, to prevent a spill in the sewer.

The type of bladder 30 that will be used (e.g., bladder material, thickness, coating), and the inflation pressures will depend on the application in which the system 11 will be used. For instance, it may be required to use specific types of rubbers in view of the potential presence of hazardous materials in contact with the bladder 30.

Returning to FIG. 3, wires 43-43'" extend internally into an internal contacting sleeve section 50 protectively enclosed within the casing 22. The wires 43-43'" are electrically coupled to both a water sensor unit 52 and a programmable central processing unit (CPU) 54. CPU 54 preferably takes the form of an electronic card. The electronic card 54 is electrically coupled through an internal connecting wire 56 to a relay component 58, and to the various afore-described components of the system 11 (e.g., compressor 40, pressure regulator 42, pneumatic distributor 44, etc. . . . ). An alarm means preferably of the audible piezo type 60 is further operationally mounted within the casing 22 to CPU 54.

The power to the components within the casing 22 is provided by a battery type component 62 being chargeable through a battery charger and converter component 64 preferably of the 120 volt/12 volt DC type. There may also be a redundant battery 62 to ensure that the system 11 does not run out of power. Moreover, the battery 62 may be sealed to be replaced underwater. A transformer is adapted to be plugged into a conventional external mains electrical wall outlet through the use of a conventional male plug 66.

In the event that the system 11 operates on battery power for instance because of a power outage, the system 11 may operate in a low-consumption mode. In such a mode, the various powered components of the system 11 go in standby mode if possible. For instance, a display panel may automatically shut down unless activated by a user. In the low-consumption mode, the system 11 keeps only the primary functions in operation, such as the monitoring via the sensor 48.

An outlet cable 68 is electrically coupled to the relay 58 at a proximal end thereof and at a distal end thereof to a display panel 70 (FIG. 4) mounted on the cover of the casing 22, or to other systems 11, or to a main unit as described hereinafter. Moreover, the outlet cable 68 may be connected to a pump, to the main water supply or the like, or any other actuator of the flow in the conduit 14 to stop the pump or the like if a condition is detected. The display panel 70 preferably includes a first display area 72 for providing visual cues as to the inflation status of the bladder 30, a second display area 74 providing visual cue information on the moisture detection status, a third visual display area 76 for providing visual cues as to the working status of the system as whole, and a fourth display area 78 adapted to provide visual cue indication preferably with a three color code as to the condition of both the battery component 62 and charger component thereof.

A first control button 80 is provided for allowing the reset of the internal clock conventionally integral to the CPU 54, a second button control 82 is provided for setting of the internal clock, a third control button 84 is provided for manual testing of the system; while a fourth control button 86 is provided for stopping the audible alarm. An external port 90 (e.g., usb port, etc) may be provided to connect the system 11 to any network (as explained hereinafter) or to any other component (e.g., alarm system, internet).

It should be understood that various modifications can be made to the control panel 70 without departing from the scope of the present disclosure and that the herein above description only refers to an example of such display panel 70.

In use, the sensors 48 are adapted to sense moisture or a gas and/or detect by physical engagement with a liquid inside sewer conduit 14 a preset level and, once a moisture/gas upper threshold level or liquid detection has been reached, to activate the air compressor 40 so as to inflate the bladder 30. The sensor(s) 48 may stay in a detection mode (e.g., continuously, periodically) while the bladder 30 is inflated (e.g., FIG. 2). When the detected fluid level returns to the acceptable threshold level, the central processing unit 54 actuates the pneumatic distributor 44 to deflate the bladder 30. Any appropriate type of valve or pump may be used as an alternative to the pneumatic distributor 44, to release the pressure in the bladder 30, and to ensure the bladder 30 returns to its contracted state in the intermediate section 34 (e.g., FIG. 1). The bladder 30 may be inflated by way of a normally closed valve (e.g., 44) when appropriate. In such a case, the bladder 30 inflates in the absence of a regular signal to the normally closed valve.

The deflation air may be used as a cleaning air stream for the sensor(s) 48. In such a case, appropriate valves and conduits are provided to direct the deflation air on the sensor(s) 48 for cleaning purposes. Alternatively, a separate line connected to the pressure source may be provided for this purpose.

The central processing unit 54 preferably has a built-in self-test feature that periodically measures the conductivity of the moisture sensor 48, and/or could activate the compressor 40, so as to ensure that the latter maintains a predetermined pressure inside the bladder 30. The self-test also preferably includes monitoring of the battery 62 and of the battery charger 64. The self-test feature ensures that the battery 62 is sufficiently charged to allow the full deployment of the inflatable bladder 30 in case there is a mains electrical input power blackout. Another feature of self-test is the partial inflation of the bladder 30. The pressure in the pneumatic line 38 may be monitored during the partial inflation to ensure that the bladder 30 inflates. According to an embodiment, if the measured pressure does not reach a predetermined threshold or slowly decreases after having reaching a threshold, there may be a leak in the pneumatic line 38 or in the inflatable bladder 30, prompting the CPU 54 to indicate an error. Moreover, if the threshold is reached too quickly, the pneumatic line 38 may be blocked or the inflatable bladder 30 may not be inflating.

Figure 10:
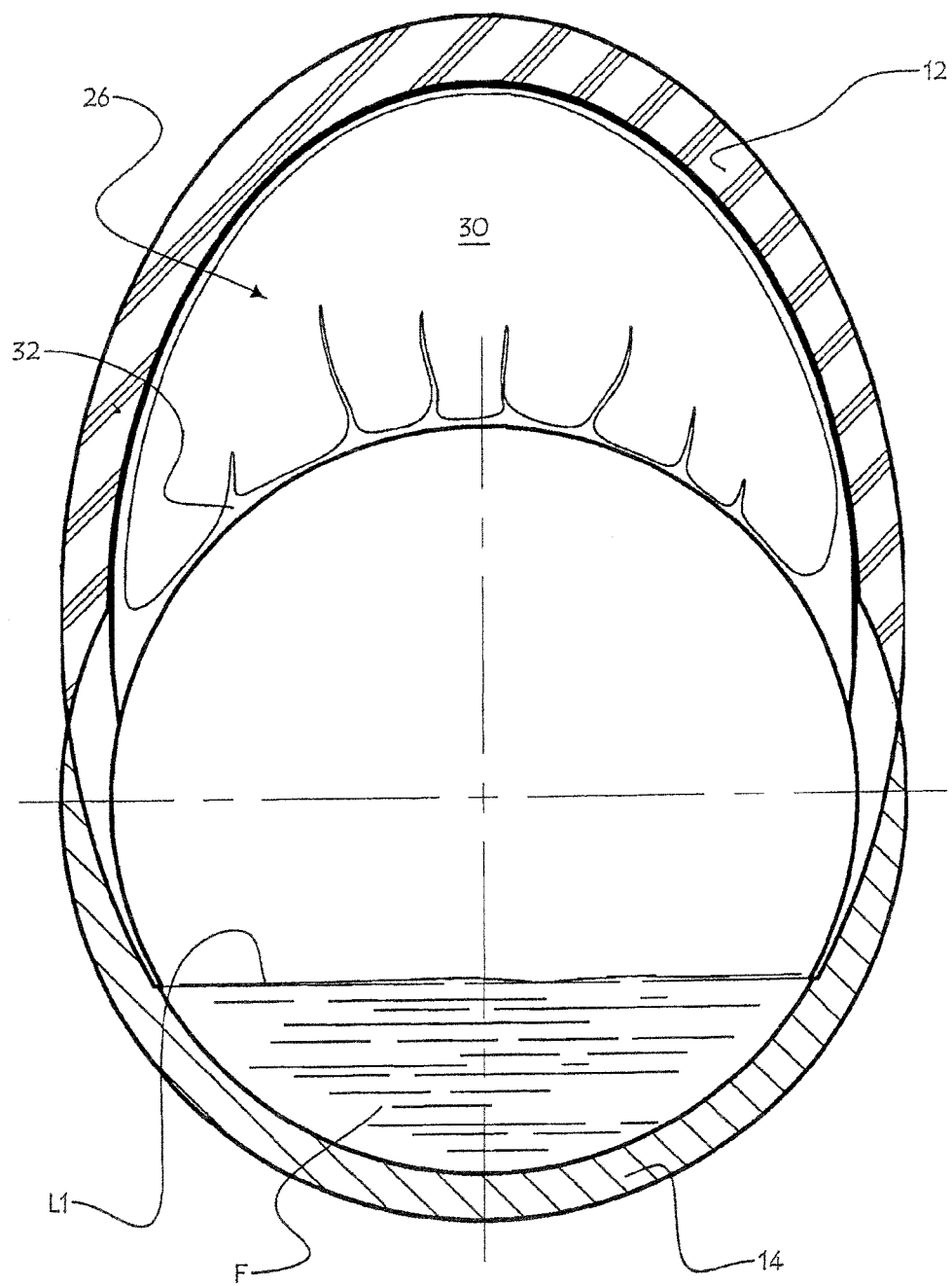
FIG. 10: is a enlarged cross-sectional view taken along lines 10-10 of FIG. 1, showing how the inflatable bladder clears the sewer conduit in the retracted inoperative condition thereof.
Figure 11:
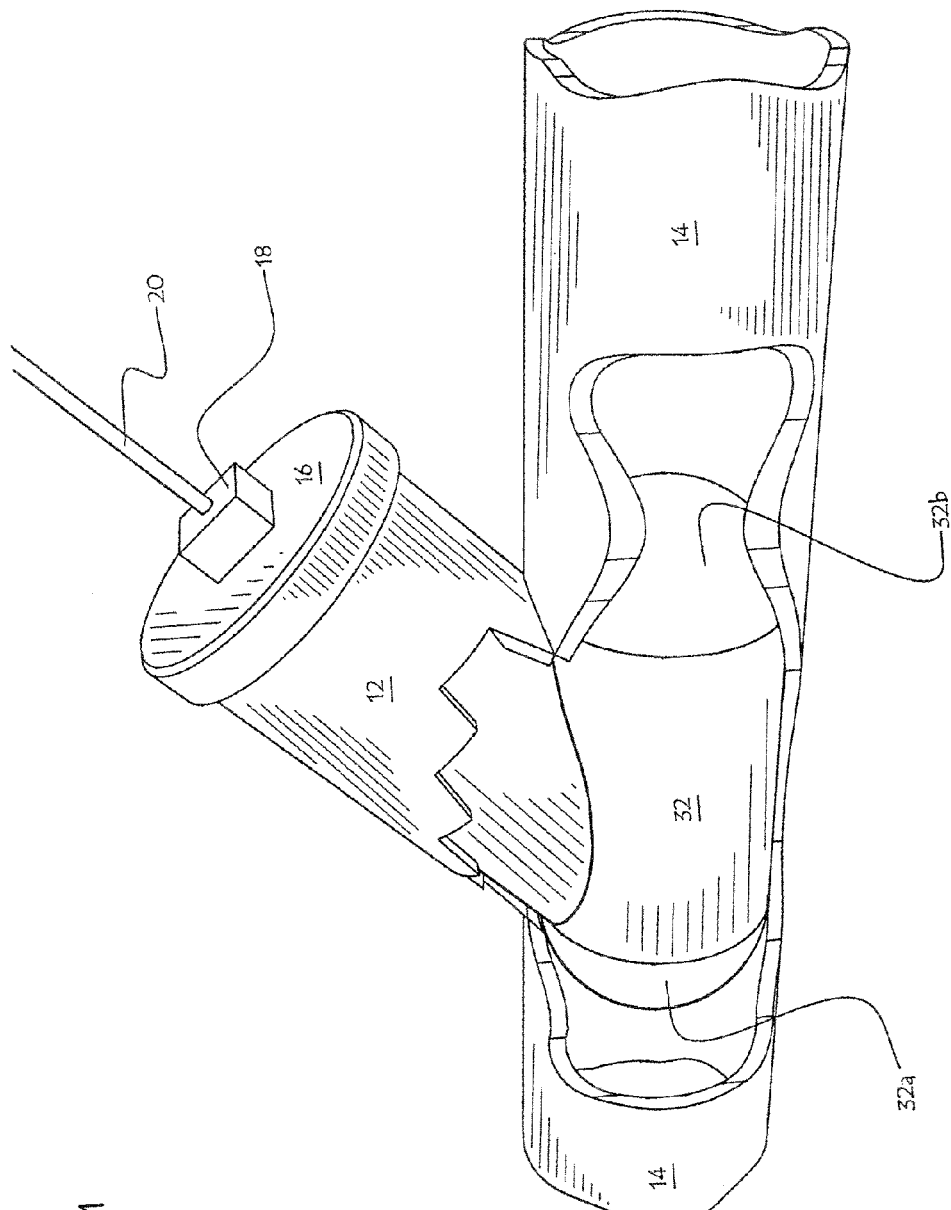
FIG. 11: is a partly broken perspective view of the sewer duct, showing the inflatable bladder in its operative fully inflated condition, similarly as in FIG. 2.

Preferably and as illustrated in FIGS. 10 and 11, the section 32 of the inflatable bladder 30 has a toroidal shape once inflated, for releasably sealing the sewer duct 14, and assisting in hydrodynamic fluid management. Preferably, the opposite ends of the longitudinal axis of the toroidal bladder 30 each form convex half-spheres 32A, 32B, for optimal hydrodynamic fluid flow management.

Figure 13:
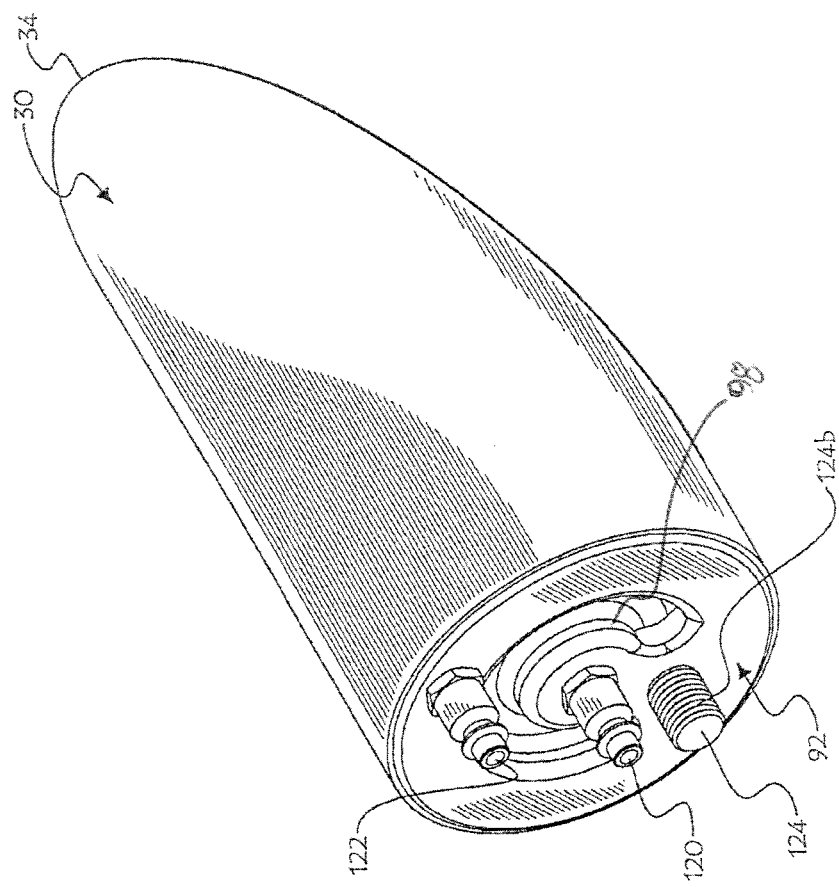
FIG. 13: is a perspective view of the discoid support system of FIG. 12 with a bladder thereon.
Figure 12:
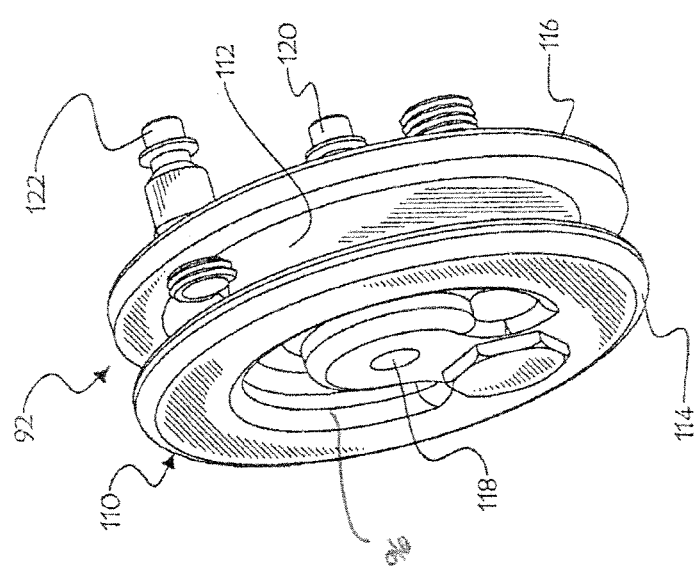
FIG. 12: is an enlarged view of a discoid support system, in accordance with another embodiment of the present disclosure.

Preferably and as illustrated in FIGS. 12 and 13, to facilitate handling of bladder 30, there is provided a discoid support system 92 which is installed transversely inside clean-out duct 12 at the inner end thereof opposite outer closure cap 16. The discoid support system illustrated in FIG. 12 is spacedly proximate to the main conduct 14. Access to the free top face of discoid support system 92 is easily achieved simply by removing screw cap 16, and by an operator reaching out with his/her arm through the clean-out duct 12 for maintenance thereof.

The inflatable bladder 30 peripherally abuts against and is fixedly mounted to the under face of discoid support system 92, with an annular plenum 112 formed between flanges of the discoid support system 92, such as flange 110 (and peripheral edges 114 and 116). The discoid support system 92 with two facing half-moon holes 96, 98 comprising therebetween a hang screw rod 124 with threading 124b for positioning the discoid support system 92 inside the clean-out duct 12. An air valve with port 118 may be provided on the disk of the system 92 to inflate the inflatable bladder 30 to the inflated condition, with a portion thereof shown at 120 as protruding inside the bladder 30. An air valve system anchor proximate assists in the positioning of the present discoid support system. The sensor cable connectors 46 (see FIG. 6) are inside a sheathed anti-corrosive cable that reaches the sensors 43-43''' that are inside the inflatable bladder 30 at its extremity. The present discoid support system 92 is solid, light weight, and does not require any measurements for its installation, since a sound cue, for example a "click" sound, is felt thru the installation rod that reveals it has reached its operational set position in the clean-out duct 12, as shown in FIG. 12. This sound cue comes from the shape of the inflatable bladder 30. The discoid support system is readily removed from its set position inside the clean-out duct 12 by first pulling the clips of a power cable protection to unfix and upwardly pullback the discoid support system 92. Alternatively, the inflatable bladder 30 may be provided with chains or the like to pull the bladder 30 out of engagement with a pipe.

Figure 14:
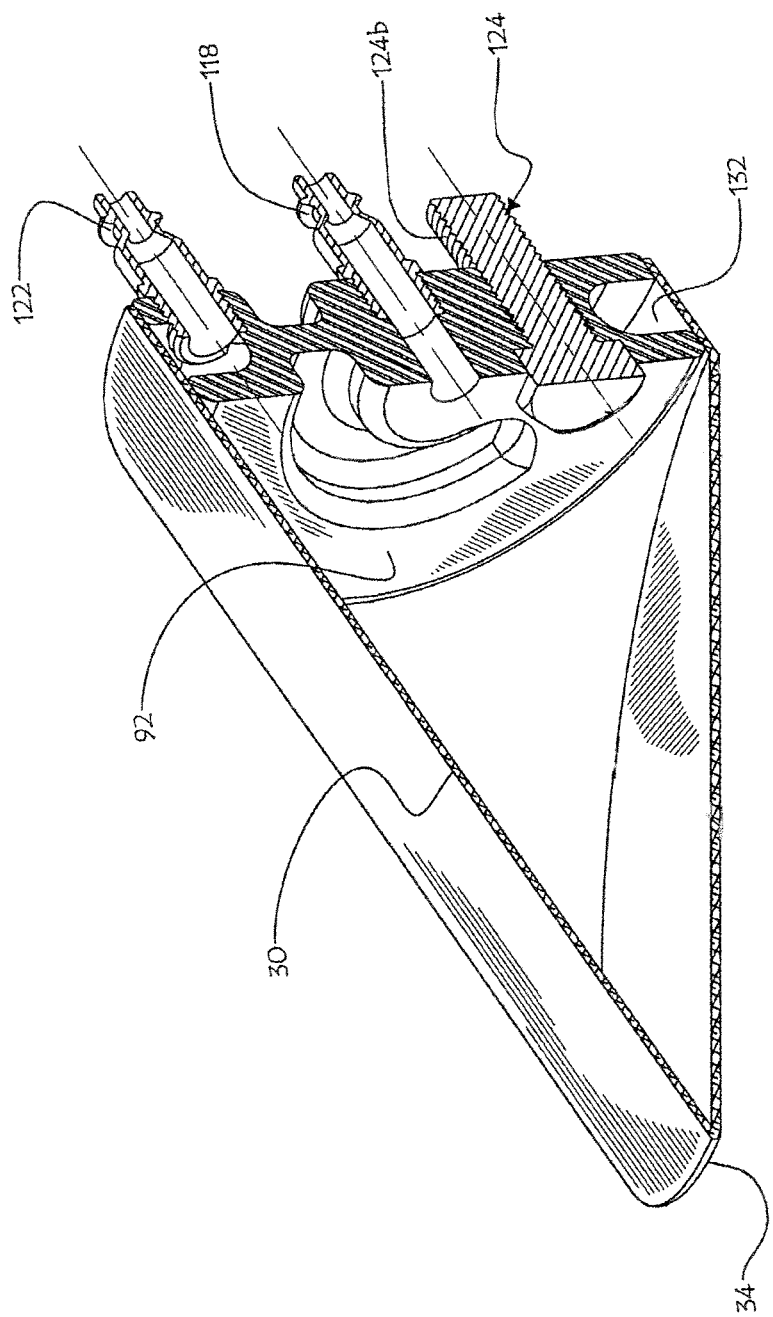
FIG. 14: is an enlarged longitudinal sectional view of the discoid support system from FIG. 12.

In FIG. 14, the discoid support system 92 comprises a fluid port 122 for the inflation/deflation of the annular chamber 132, to seal off any gap between the outer periphery of the bladder 30 at the discoid support system 92 and the pipe. As an alternative to this embodiment, the inflatable bladder 30 may simply be sized so as to be obstructing the pipe when inserted therein, with the inflatable bladder 30 consisting primarily of a rubber material.

According to one embodiment, the inflatable bladder 30 is suited with wireless sensors 48 operatively mounted to the conduit 14 and positioned to detect a fluid backflow problem. The wireless sensors 48 could be mounted to the extremity of the bladder 30 or being optimally located inside the conduit 14 on the side of the fluid backflow flow side as to permit the sensors 48 to detect when the fluid backflow is resolved. Once a fluid backflow situation is resolved, it may automatically trigger inactivation of the inflatable bladder 30 and resume fluid flow in the conduit 14 to its normal uses.

Figure 20:
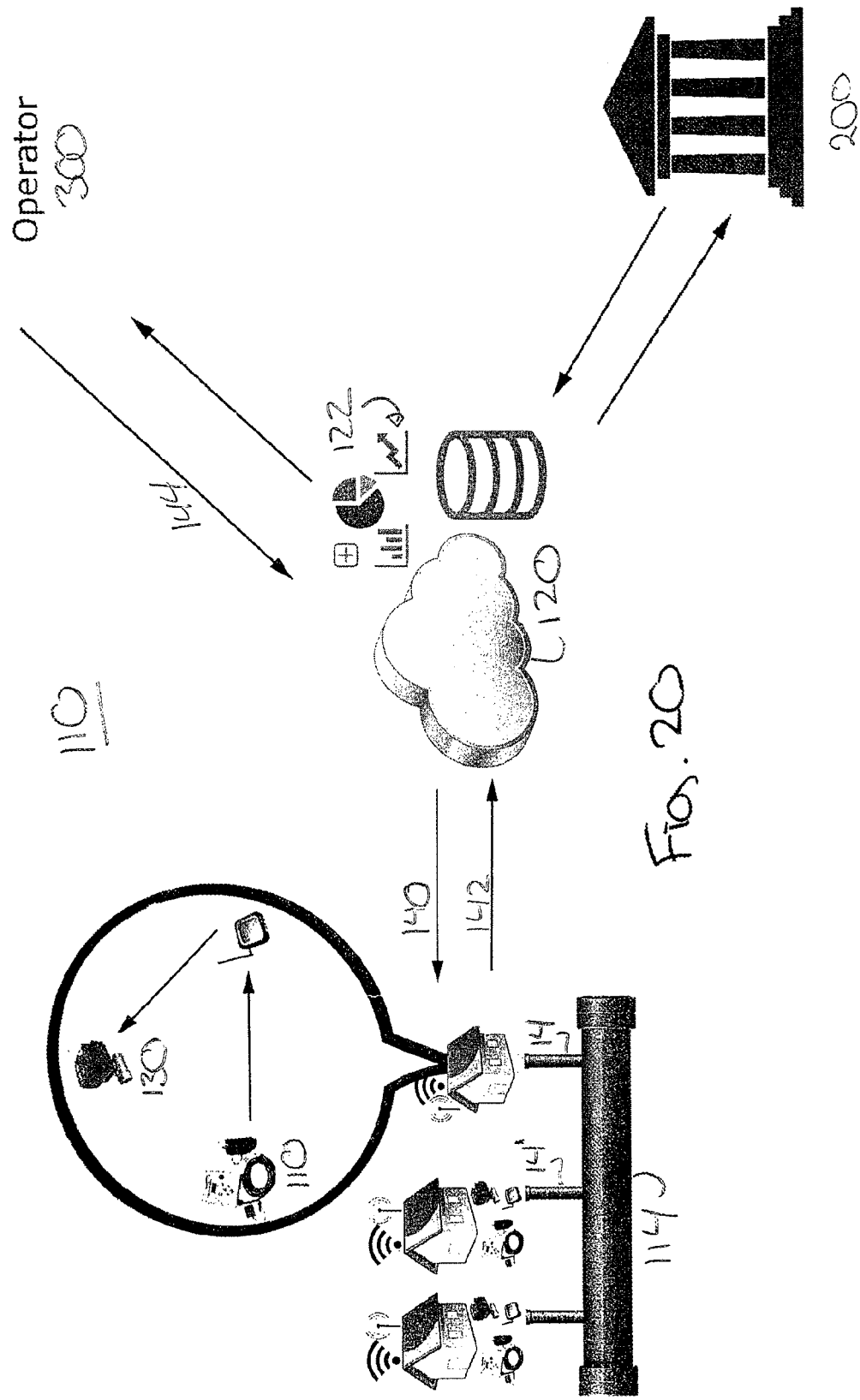
FIG. 20: is a schematic view of a fluid management system.

According to an embodiment, now referring to FIG. 20, the fluid management system 110 comprises a fluid backflow prevention device 100 having bidirectional communication capabilities. According to an embodiment, the fluid backflow prevention device 100 is operatively connected to a server or cloud based system 120 for live monitoring of the fluid backflow device 100. The cloud based system 120 may be suited with various features, from a server for storing conduit 14 conditions for review to live monitoring dashboard 122 accessible by the owner, city utilities 200 or insurances providers. As such, the cloud system 120 may be used for data storage and analysis in addition to live monitoring through the use of a dashboard 122. Additionally, some system may be suited with cloud preemptive fluid backflow device 100 activation capabilities. Systems with such features could be actioned through the cloud based system 122 or remotely activated. The remote preemptive activation of the device 100 could be coupled with a series of complementary or compulsive actions. For instances, the remote preemptive activation of the fluid backflow device 100 could be held until the home owner remotely authorize the deployment of the fluid backflow device. In such an embodiment, the owner might receive a SMS requesting authorization for preemptive deployment of the device 100 due to deployment of similar systems or devices in adjacent neighborhood houses. The owner authorization may be requested via a mobile application of through email or other web services. According to another embodiment, depending on the user preferences, the system 110 could alert the owner of an imminent deployment. In such cases the owner may be given 1-5 minutes to reply as to interrupt the preemptive deployment of the system and where no interruption of the deployment from the owner is detected, the deployment would proceed. Such a procedure would insure deployment regardless of the speed of response of the owner to the alert. Understandably, the type of alert of mode of operation of the device may be chosen by the owner and modulated to the user needs. For instances, the user may want preemptive alert to proceed straight to deployment while the premises are unoccupied as opposed to preferring an alert and authorization for period where the premises are occupied. Some factors that may influence the process for preemptive deployment of the system 110 and owner preferences. As such, where the fluid management system 110 controls both fluid backflow prevention devices 100 and water inlet valves 130, the owner may desired to be informed or have its authorization before actuating the deployment of the systems.

According to an embodiment, the cloud system 120 could serves various functions such as alerting citizens 140 of nearby deployment of the fluid control devices 100, detecting the deployment of systems 142, be used for software update and technical support 144 of the systems, actuate the deployment of the devices 100 in cases of hazardous event as triggered by the city 200 or during infrastructure maintenances. The city 200 may use the fluid management system 110 for deploying the fluid control devices 100 in conduit 14 where the city 200 maintenance crew is repairing conduit such as sewer systems. In a smart city dynamics, the city 200 could use fluid control devices 100 to selectively obstruct some conduit 14 and optimize the fluid flow in a conduit network 114.

According to an embodiment, still referring to FIG. 20, the cloud based system 120 may be operated by someone providing third party monitoring of the conduit systems also referred to as an operator. Alternatively, the fluid management system 110 could be integrated to alarm system providers and managed remotely according to data received from the devices 100 located in the premises. The device 100 could be actioned by first responders in cases of specific events. As such, in a fire, where fireman suspect hydrocarbon leakage from a tank inside the premises they may preemptively deploy the fluid control device 100 thus preventing hydrocarbon from entering the city conduit system 114.

According to one embodiment, the cloud connection may be the result of a Wi-Fi or GSM module or from a wired connection through the premises. The ability of some embodiments to interrupt the water inlet 130 may make such system handy in case of contamination of the water supply. The fluid management system 110 could preemptively interrupt the water flow in all premises of a certain area. In some cases, for mild contamination, the owner may receive a notice requiring him to boil water before consumption. In such milder cases, the water could be interrupted and as the owner informed through various notice system (SMS, mobile app, email alert, etc.) upon which the owner had the option to disable the system and reopen the water inlet 130.

Figure 21:
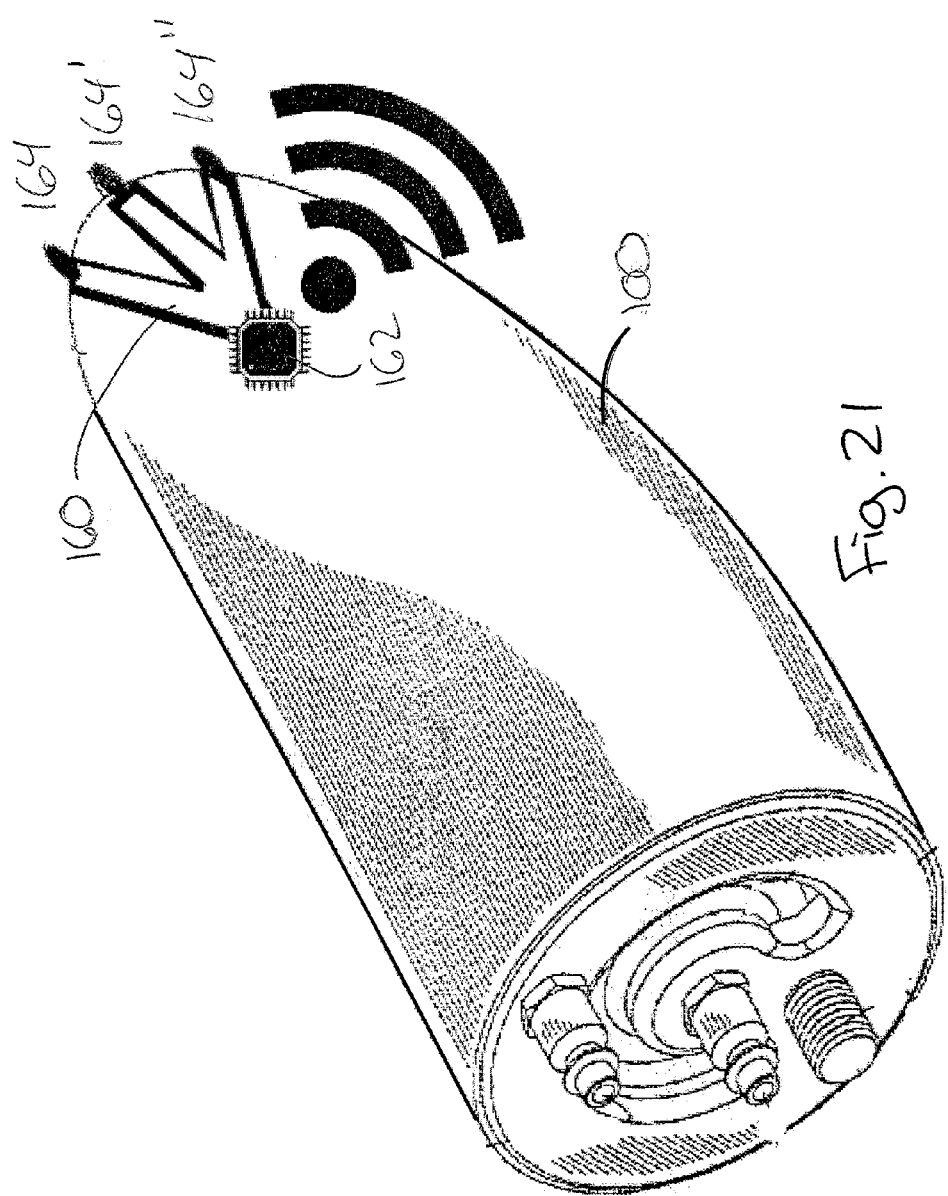
FIG. 21: is a perspective view of the fluid back prevention device support system.

Now referring to FIG. 21, according to one embodiment, the fluid backflow prevention device 100 comprises a wireless sensing system 160. The wireless sensing system may comprise wired sensors 164 connected to a wireless module 162 on the device itself or have wireless sensors (not shown) all independently able to communicate with a control module or cloud based system 120 wirelessly. The former, the wired sensors 164 with a wireless module 162 could be used for retrofitting or upgrading wired system to a wireless system. Notably, a wireless sensing system 160 requires energy input. Therefore, wireless sensing systems could be battery powered or have wireless sensors 164 which are water powered such as piezoelectric devices. Accordingly, the wireless sensing system 160 could autonomously communicate the sensed information to a central cloud system 120. Understandably, the cloud based system 120 could be located on the premises of located remotely. Essentially the cloud system 120 need to receive the sensed data and have the ability to communicate with the devices 100 or control panel for actuating deployment when required (i.e. when certain preset conditions are met).

According to one embodiment, the communication may be initiated from the device 100, for instance, the communication of data to the cloud 120 or initiation of deployment of a multi device 100 system following sensing of a local condition. The communication in the two-ways communication fluid management system 110 may be from the operator 300, system administrator, owner or city employee 200 to the device 100. For instances, the user or an operator 300 may desire to activate deployment of the system remotely 110. As such the user or an operator sends the instruction wirelessly through the cloud based system 120 and trigger deployment of the system 110.

Figure 15:
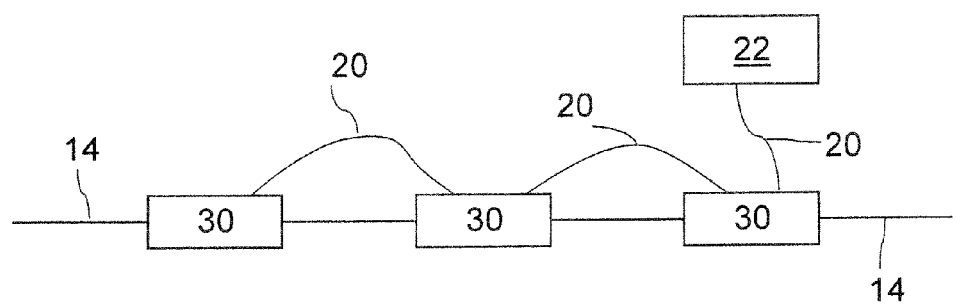
FIG. 15: is a block diagram showing a plurality of the bladders in series on a single conduit 14 and controlled centrally.
Figure 16:
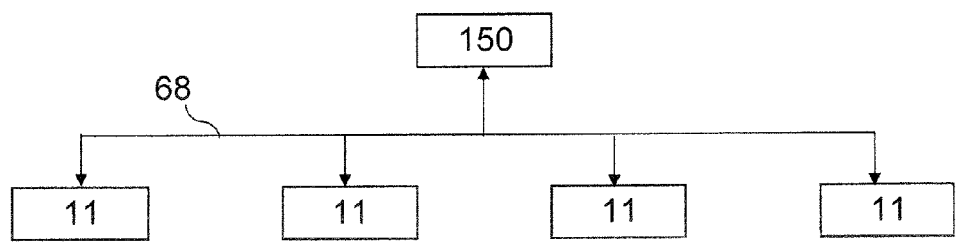
FIG. 16: is a block diagram showing a plurality of the fluid backflow preventing system used controlled centrally.
Figure 22:
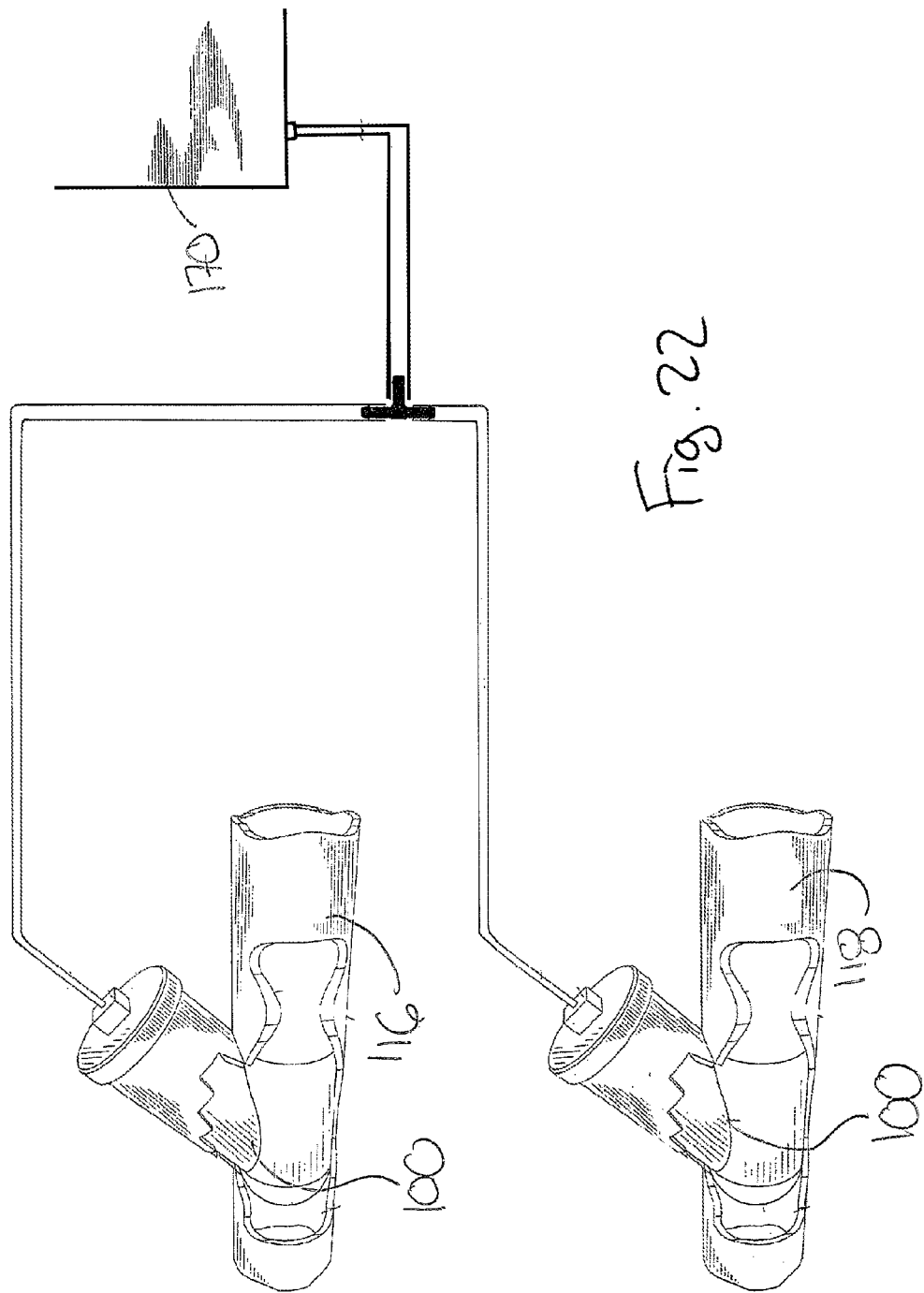
FIG. 22: is a schematic view of a multi fluid backflow prevention device system.

Referring to FIGS. 15 and 22, there is illustrated a plurality of the bladders 30 interconnected in series, and controlled centrally by a single CPU 54 (FIG. 3) in casing 22. The bladders 30 are interconnected by appropriate lines and cables in the cable sleeves 20. Accordingly, by the use of a plurality of the bladders 30 on a single conduit 14, numerous levels of safety may be provided. There may be a protocol among the various bladders 30, such that the detection of a condition outside the threshold values for any one of the bladders 30 results in the inflating of all bladders 30 by the CPU 54. Moreover, the protocol may be such as to automatically inflate any one of the bladders 30 if a related one of the cable sleeves 20 is sectioned.

Referring to FIG. 15, a plurality of the systems are connected to a main controller 150. The main controller 150 is strategically positioned to obtain a global view of a network of conduit. For instance, the systems 11 of FIG. 15 are positioned in various conduits of a sewer, with the main controller 150 capable of identifying a global flooding condition from the monitoring of each of the systems 11. The main controller 150 has the capacity of actuating each of the systems individually, to manage the flow of liquids in the sewer system. Now referring to FIG. 22, other embodiments of the fluid management systems comprise a plurality of devices 100 connected to various conduits in a network 114. For instance, a fluid backflow prevention device could be installed in a sanitary drain 116 and another in a storm drain 118 where both devices 100 are operatively connected (wire or wireless) to a central control panel 170.

Figure 23:
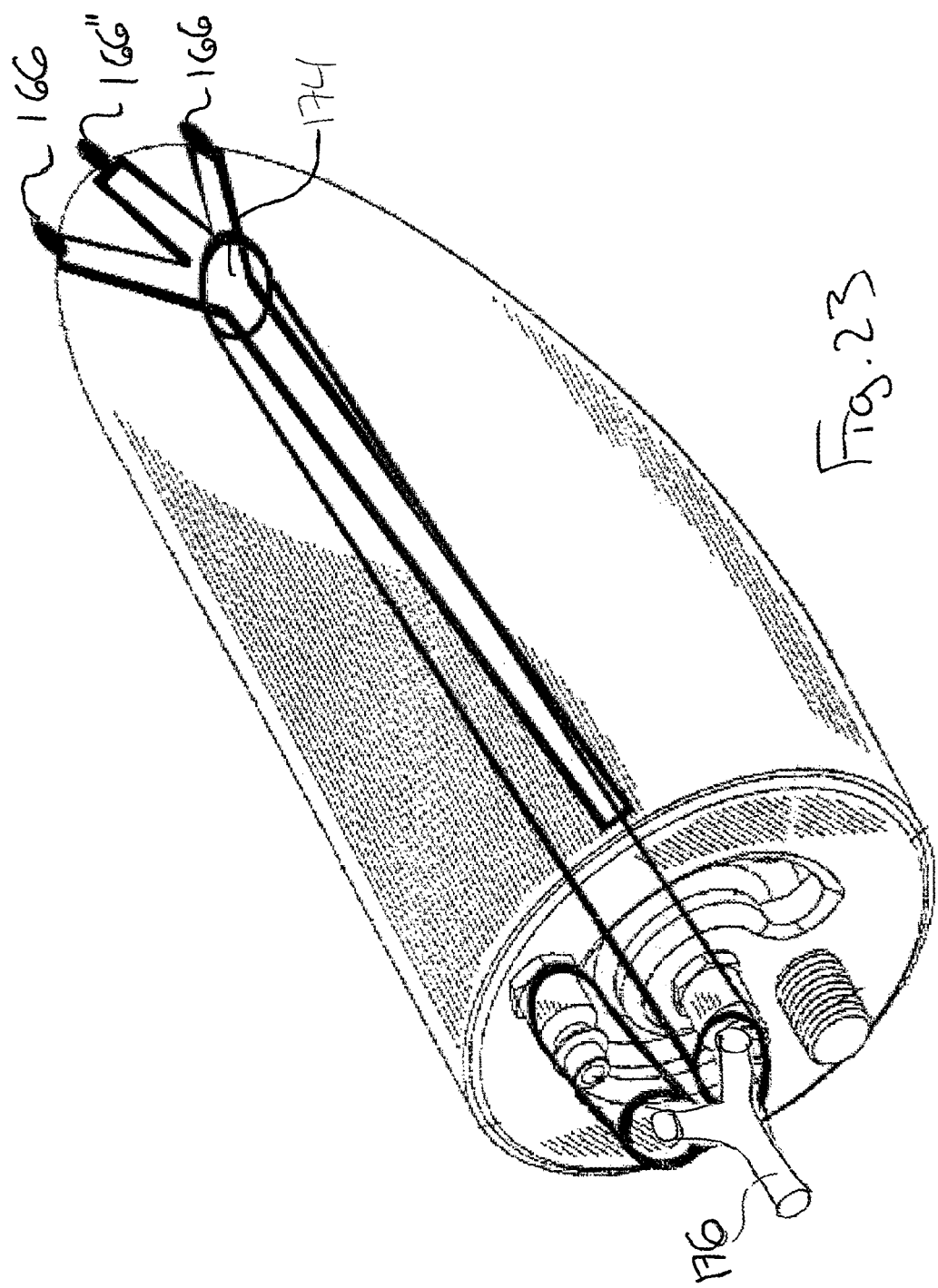
FIG. 23: is a perspective view of the fluid back prevention device support system having a sensor cleaning system feature integrated thereto.

Now referring to FIG. 23, according to an embodiment, the fluid management system 110 may comprise fluid backflow prevention device 100 having auto cleaning capabilities. Accordingly, the device 100 comprises air conduits 174 connected to the air supply 176 of the bladder 30 and about the sensors 166 for cleaning the sensors 166 from material potentially obstructing the sensing of a certain condition or creating a false positive in the system 110. The sensor 166 auto-cleaning feature may be preprogrammed for actuation at specific intervals to insure unobstructed data collection. The system 110 could as well be programmed to initiate cleaning once a condition is detected to insure the condition is real and mandate deployment of the device 100.

According to yet another embodiment, the fluid management system 110 comprises one or more autonomous fluid backflow prevention devices 400 preprogrammed and able to operate without being connected to conventional utilities. Now referring to FIG. 24, the autonomous fluid back up prevention device 400 comprise sensors 402, a bladder 410, a gas source 420, a power source 430 and a control module 440. Accordingly to this embodiment, the gas source 420 may be a carbon dioxide tank 420 connected to a relay, the relay responsible for actuating the gas tank 420 to inflate the bladder 410 upon detection of a condition from the sensors 408. The power source 430 may come from a piezoelectric system or from a battery located within the autonomous system 400. Understandably, where access to the utilities is possible, it will be desired to have a conventional system installed thereto. However, for remote locations or for conduits hardly accessible and with no quick utility connections, the autonomous system could be of great use. These preprogrammed systems are generally single uses systems. The preprogrammed system may alternatively be configured for multiple uses by increasing for instances the size of the gas tank 420 and having a power source capable of providing for such multiple deployment of the system.

Figure 24:
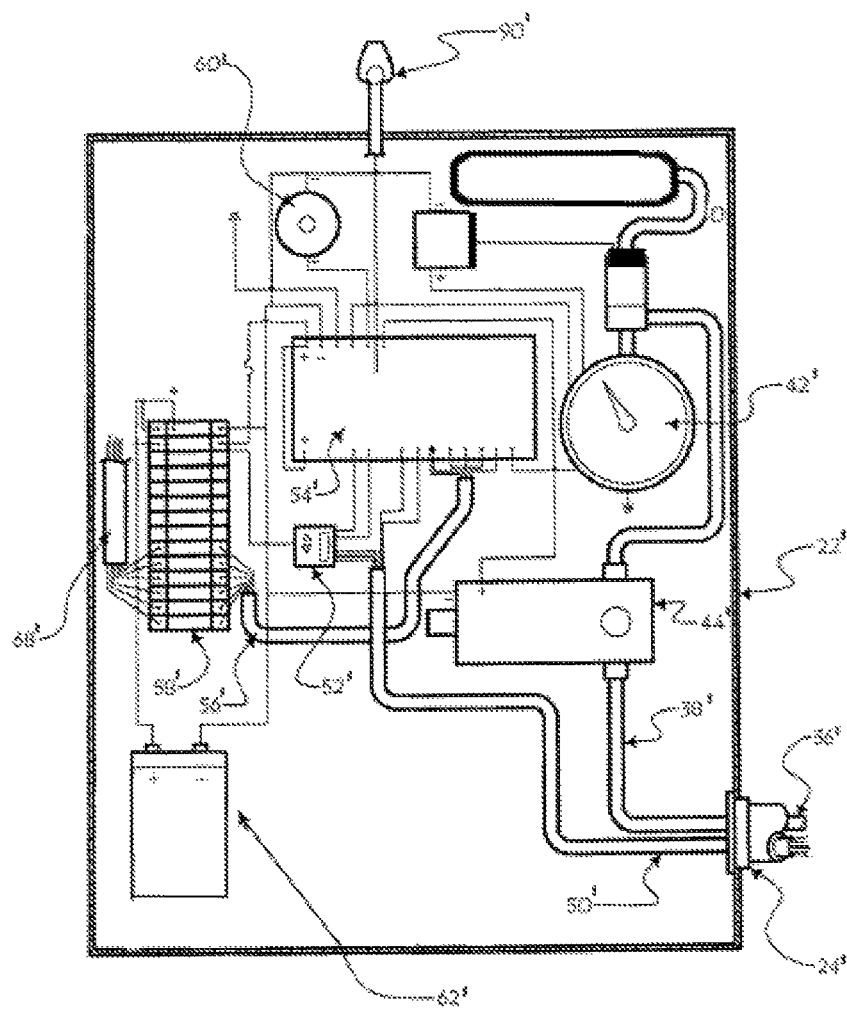
FIG. 24: is a schematic view of an autonomous fluid management system.

According to an embodiment, now referring to FIG. 24, the fluid management system 110 may be miniaturised. In such an embodiment, the electronic components, generally in the control panel, are integrated to the cover of the clean out of the conduit 14, the miniaturized circuit may be autonomous and powered by batteries such as conventional 9V batteries 62'. The alarm conditions are transmitted through wireless communications and pressurized gas is provided through small $CO_2$ cartridges. In such an embodiment, the sensors may be wired or piezo-wireless. According to this embodiment, the miniaturized fluid management system is a smart integrated device that is autonomous while having the ability to be connected to a network.

According to another embodiment, the fluid backflow prevention devices 100 could communicate with adjacent devices 100 in nearby premises without the use of a central cloud based system 120.

According to one embodiment, the method for managing fluid comprises the steps of:
 a. Installing a fluid back prevention device in a conduit;
 b. Installing a control panel in a location near the conduit;
 c. Operationally connecting the fluid backflow prevention device with the control panel.

According to another embodiment, the method may further comprise additional steps such as wirelessly connecting the device to the control panel, wirelessly connecting the device or control panel to the cloud.

According to one embodiment, the method for managing fluids comprises the steps of:
 a. Sensing the condition in the conduit;
 b. Deploying the fluid back prevention device if a fluid backflow condition is sensed or deployment instructions are sent from the user, cloud administrator or city employee.

According to another embodiment, the method may further comprise the step of monitoring the condition until it no longer meets the predetermined criteria for deployment and deflating the bladder to remove from the conduit.

The present disclosure provides an improved fluid backflow preventing system. Advantages of the present disclosure include the fact that the system in accordance with the present disclosure may be readily adapted to existing sewer conduits without the need for special tooling, manual dexterity or other expensive commodities.

Also, the present disclosure provides a built-in sensing means for actuating the valve in predetermined conditions.

Furthermore, the present disclosure provides a system having a self-checking feature so as to improve overall reliability.

Also, the present disclosure uses a duct sealing means that is deformable so as to provide an efficient seal even in situations wherein the sewer conduit is warped or otherwise damaged.

Furthermore, the present disclosure provides a built-in audible warning means for alerting the dwelling occupants of the flood threatening situation.

The invention claimed is:

1. An assembly for blocking a conduit upon detecting a problem condition for a fluid, the conduit:
 defining an inner cavity in which the fluid flows and having a longitudinal axis, the conduit being in fluid communication with a clean-out duct transversally opening into the inner cavity of the conduit and having a longitudinal axis forming an angle of about 45 degrees with the axis of the conduit;
 the assembly comprising:
  an inflatable bladder configured to be inserted in a section of the inner cavity of the conduit via the clean-out duct, the inflatable bladder once inflated having a toroidal shape having a longitudinal axis aligned with the longitudinal axis of the conduit, the bladder being inflatable/deflatable between a deflated inoperative condition and an operative inflated condition in which the bladder is inflated for sealingly closing the conduit section;
  at least one sensor adapted to detect the problem condition of the fluid and positioned in the conduit on at least one side of the inflatable bladder, and beyond a contact area between the inflatable bladder and the conduit, the side being that related to the problem condition of the fluid; and
  a control panel having:
   a pressure system in fluid communication with the inflatable bladder to inflate the bladder to the operative inflated condition, and to deflate the bladder; and
   a processor unit for actuating the pressure system when the problem condition is detected by the at least one sensor, and for subsequently deflating the bladder when the problem condition is not detected.

2. The assembly according to claim 1, further comprising two of said sensor, with one of said sensors on each side of the inflatable bladder to detect two different problem conditions.

3. The assembly according to claim 1, wherein the inflatable bladder is accommodated in the clean-out duct of the conduit when in the deflated inoperative condition.

4. The assembly according to claim 3, wherein the pressurized system and processing unit are configured to be integrated to a cover of the clean out duct.

5. The assembly according to claim 1, further comprising at least a second inflatable bladder downstream of the first in the conduit, the first and second inflatable bladder both connected to the same pressure system.

6. The assembly according to claim 1, further comprising at least a second inflatable bladder in another conduit, the first and second inflatable bladder both connected to the same pressure system.

7. The assembly according to claim 1, wherein the pressure system comprises a pressure source actuated by the processing unit to create flow of pressurized fluid, at least one pressure line in fluid communication between the pressure source and the bladder to inflate the bladder, exhaust means to deflate the inflated bladder, and valves controlled by the processing unit to operate inflating/deflating cycles.

8. The assembly according to claim 7, further comprising a casing located away from the conduit for housing the pressure source and the processing unit.

9. The assembly according to claim 7, wherein the pressure system is a pneumatic system.

10. The assembly according to claim 1, wherein the pressure system comprises a cleaning line connected to a remainder of the pressure system and having an outlet end adjacent to the sensor to blow fluid on the sensor.

11. The assembly according to claim 10, wherein the cleaning line is connected to one of the pressure source and the pressure line.

12. The assembly according to claim 10, wherein the cleaning line is part of the exhaust means, whereby fluid blown on the sensor is fluid exhausted from the bladder during deflating.

13. The assembly according to claim 1, wherein one sensor is a wireless sensor.

14. The assembly according to claim 13, wherein one sensor is a piezoelectric powered sensor.

15. The assembly according to claim 1, further comprising a communication unit to enable communication with adjacent devices in nearby premises.

16. A method for blocking a conduit upon detecting a problem condition for a fluid flowing in the conduit, the conduit defining an inner cavity in which a fluid flows and having a longitudinal axis, the conduit being in fluid communication with a clean-out duct transversally opening into the inner cavity of the conduit and having a longitudinal axis forming an angle of about 45 degrees with the axis of the conduit;

the method comprising the steps of:
inserting an inflatable bladder in a section of the inner cavity of the conduit via the clean-out duct, the inflatable bladder once inflated having a toroidal shape having a longitudinal axis aligned with the longitudinal axis of the conduit, the bladder being inflatable/deflatable between a deflated inoperative condition and an operative inflated condition in which the bladder is inflated for sealingly closing the conduit section;
detecting the problem condition of the fluid using at least one sensor positioned in the conduit on at least one side of the inflatable bladder, and beyond a contact area between the inflatable bladder and the conduit, the side being that related to the problem condition of the fluid;
inflating the bladder to the operative inflated condition using a control panel having a pressure system in fluid communication with the inflatable bladder to inflate the bladder, and a processor unit for actuating the pressure system when the problem condition is detected by the at least one sensor; and
subsequently deflating the bladder when the problem condition is not detected.

17. The method of claim 16, further comprising the step of wirelessly connecting the device to the control panel.

18. The method of claim 17, further comprising the step of wirelessly connecting the device or control panel to a cloud system.

* * * * *